(12) United States Patent
Kishimoto et al.

(10) Patent No.: US 8,833,991 B2
(45) Date of Patent: Sep. 16, 2014

(54) LIGHT EMITTING DEVICE, WITH LIGHT GUIDE MEMBER HAVING SMALLER EXIT SECTION, AND ILLUMINATING DEVICE, AND VEHICLE HEADLIGHT INCLUDING THE SAME

(75) Inventors: Katsuhiko Kishimoto, Osaka (JP); Koji Takahashi, Osaka (JP); Shigetoshi Ito, Osaka (JP); Hidenori Kawanishi, Osaka (JP)

(73) Assignee: Sharp Kabushiki Kaisha, Osaka-shi, Osaka (JP)

( * ) Notice: Subject to any disclaimer, the term of this patent is extended or adjusted under 35 U.S.C. 154(b) by 0 days.

(21) Appl. No.: 13/023,300

(22) Filed: Feb. 8, 2011

(65) Prior Publication Data

US 2011/0194302 A1    Aug. 11, 2011

(30) Foreign Application Priority Data

Feb. 10, 2010   (JP) ................. 2010-028176

(51) Int. Cl.
*B60Q 1/04* (2006.01)
*F21V 8/00* (2006.01)

(52) U.S. Cl.
USPC ...... 362/511; 362/296.05; 362/237; 362/257; 362/296.01

(58) Field of Classification Search
None
See application file for complete search history.

(56) References Cited

U.S. PATENT DOCUMENTS

| | | | |
|---|---|---|---|
| 3,701,895 A | 10/1972 | Sweetser | |
| 4,688,884 A * | 8/1987 | Scifres et al. | 385/38 |
| 4,723,198 A * | 2/1988 | Levin et al. | 362/516 |
| 5,278,731 A | 1/1994 | Davenport et al. | |
| 5,535,230 A | 7/1996 | Abe | |
| 5,647,662 A | 7/1997 | Ziegler et al. | |
| 5,857,768 A | 1/1999 | Ziegler et al. | |
| 5,947,592 A | 9/1999 | Barlow | |
| 6,055,154 A | 4/2000 | Azar | |
| 6,114,715 A | 9/2000 | Hamada | |
| 6,272,269 B1 | 8/2001 | Naum | |
| 6,398,366 B1 | 6/2002 | Hara et al. | |
| 6,439,751 B1 | 8/2002 | Jones et al. | |
| 6,509,674 B1 | 1/2003 | Nakagawa | |

(Continued)

FOREIGN PATENT DOCUMENTS

| | | |
|---|---|---|
| CN | 1499125 | 5/2004 |
| CN | 1824728 | 8/2006 |

(Continued)

OTHER PUBLICATIONS

Kishimoto et al., Office Action mailed Apr. 17, 2012, directed to U.S. Appl. No. 12/957,998; 7 pages.

(Continued)

*Primary Examiner* — Britt D Hanley
(74) *Attorney, Agent, or Firm* — Morrison & Foerster LLP

(57) ABSTRACT

A light emitting device of the present invention includes: a laser diode group which generates a plurality of laser beams; a cylindrical light emitting element which emits incoherent light in response to the plurality of laser beams; and a light guide irradiation section which (i) guides the plurality of laser beams entered via a light incidence plane toward a light irradiation plane and (ii) irradiates the light irradiation area of the cylindrical light emitting element with the plurality of laser beams thus guided. The light irradiation plane of the light guide irradiation section has an area which is smaller than that of the light incidence plane.

12 Claims, 9 Drawing Sheets

(56) References Cited

U.S. PATENT DOCUMENTS

| | | |
|---|---|---|
| 6,771,236 B1 | 8/2004 | Konishi et al. |
| 6,981,782 B2 | 1/2006 | Kai et al. |
| 7,108,400 B2 | 9/2006 | Yamada et al. |
| 7,147,918 B2 | 12/2006 | Nishibayashi et al. |
| 7,275,848 B2 | 10/2007 | Chinniah et al. |
| 7,309,145 B2 | 12/2007 | Nagata et al. |
| 7,367,679 B2 | 5/2008 | Emery |
| 7,422,356 B2 * | 9/2008 | Hama et al. .................. 362/574 |
| 7,478,932 B2 | 1/2009 | Chinniah et al. |
| 7,510,284 B2 | 3/2009 | Plut |
| 7,628,492 B2 | 12/2009 | Yoshii et al. |
| 2002/0044455 A1 | 4/2002 | Ozawa et al. |
| 2002/0053868 A1 | 5/2002 | Shimizu et al. |
| 2002/0187571 A1 | 12/2002 | Collins et al. |
| 2003/0052595 A1 | 3/2003 | Ellens et al. |
| 2003/0174509 A1 | 9/2003 | Futami |
| 2003/0186475 A1 | 10/2003 | Ueda et al. |
| 2004/0062699 A1 | 4/2004 | Oshio |
| 2004/0085768 A1 | 5/2004 | Kai et al. |
| 2004/0090790 A1 | 5/2004 | Ishida et al. |
| 2004/0207306 A1 | 10/2004 | Horiuchi et al. |
| 2004/0228130 A1 | 11/2004 | Kato et al. |
| 2005/0051790 A1 | 3/2005 | Ueda |
| 2005/0063169 A1 | 3/2005 | Erber |
| 2005/0094397 A1 | 5/2005 | Yamada et al. |
| 2005/0105301 A1 | 5/2005 | Takeda et al. |
| 2005/0116176 A1 | 6/2005 | Aguirre et al. |
| 2005/0116177 A1 | 6/2005 | Aguirre et al. |
| 2005/0116178 A1 | 6/2005 | Aguirre et al. |
| 2005/0116179 A1 | 6/2005 | Aguirre et al. |
| 2005/0127383 A1 | 6/2005 | Kikawa et al. |
| 2005/0243570 A1 | 11/2005 | Chaves et al. |
| 2005/0253153 A1 | 11/2005 | Harada |
| 2006/0050512 A1 | 3/2006 | Nakagawa et al. |
| 2006/0054656 A1 | 3/2006 | Narita et al. |
| 2006/0118775 A1 | 6/2006 | Nagai et al. |
| 2006/0121695 A1 | 6/2006 | Ueda et al. |
| 2006/0170332 A1 | 8/2006 | Tamaki et al. |
| 2006/0181894 A1 | 8/2006 | Chinniah et al. |
| 2006/0186377 A1 | 8/2006 | Takahashi et al. |
| 2006/0203349 A1 | 9/2006 | Kamijima |
| 2006/0232973 A1 | 10/2006 | Haga et al. |
| 2006/0238103 A1 | 10/2006 | Choi et al. |
| 2006/0239006 A1 | 10/2006 | Chaves et al. |
| 2006/0255711 A1 | 11/2006 | Dejima et al. |
| 2006/0279950 A1 | 12/2006 | Hama et al. |
| 2006/0285341 A1 | 12/2006 | Yatsuda et al. |
| 2007/0007494 A1 | 1/2007 | Hirosaki et al. |
| 2007/0008734 A1 | 1/2007 | Bogner et al. |
| 2007/0041197 A1 | 2/2007 | Saito et al. |
| 2007/0057269 A1 | 3/2007 | Ueda |
| 2007/0127240 A1 | 6/2007 | Inamoto |
| 2007/0131954 A1 | 6/2007 | Murayama et al. |
| 2007/0185261 A1 | 8/2007 | Lee et al. |
| 2007/0189352 A1 | 8/2007 | Nagahama et al. |
| 2008/0013316 A1 | 1/2008 | Chiang |
| 2008/0037268 A1 | 2/2008 | Tendo et al. |
| 2008/0051632 A1 | 2/2008 | Ito et al. |
| 2008/0074752 A1 | 3/2008 | Chaves et al. |
| 2008/0089089 A1 | 4/2008 | Hama et al. |
| 2008/0117620 A1 | 5/2008 | Hama et al. |
| 2008/0169752 A1 | 7/2008 | Hattori et al. |
| 2008/0170296 A1 | 7/2008 | Chaves et al. |
| 2008/0173884 A1 | 7/2008 | Chitnis et al. |
| 2008/0175008 A1 | 7/2008 | Hu et al. |
| 2008/0179611 A1 | 7/2008 | Chitnis et al. |
| 2008/0198603 A1 | 8/2008 | Sormani et al. |
| 2008/0205062 A1 | 8/2008 | Dahm et al. |
| 2008/0225550 A1 | 9/2008 | Sakurada |
| 2008/0237569 A1 | 10/2008 | Nago et al. |
| 2008/0239725 A1 | 10/2008 | Ishikura et al. |
| 2008/0262316 A1 | 10/2008 | Ajima et al. |
| 2008/0278460 A1 | 11/2008 | Arnett et al. |
| 2009/0008655 A1 | 1/2009 | Peeters et al. |
| 2009/0052189 A1 | 2/2009 | Kon |
| 2009/0057690 A1 | 3/2009 | Chakraborty |
| 2009/0059594 A1 | 3/2009 | Lin |
| 2009/0065790 A1 | 3/2009 | Chitnis et al. |
| 2009/0067179 A1 | 3/2009 | Chaves et al. |
| 2009/0073710 A1 | 3/2009 | Sormani et al. |
| 2009/0091237 A1 | 4/2009 | Hirosaki et al. |
| 2009/0095960 A1 | 4/2009 | Murayama |
| 2009/0128781 A1 | 5/2009 | Li |
| 2009/0201577 A1 | 8/2009 | LaPlante et al. |
| 2009/0218592 A1 | 9/2009 | Hawker et al. |
| 2009/0231874 A1 | 9/2009 | Kishimoto et al. |
| 2009/0257463 A1 | 10/2009 | Kusukame et al. |
| 2009/0273921 A1 | 11/2009 | Chiang |
| 2009/0273924 A1 | 11/2009 | Chiang |
| 2009/0296018 A1 | 12/2009 | Harle et al. |
| 2009/0296367 A1 | 12/2009 | Sekine et al. |
| 2009/0322208 A1 | 12/2009 | Shaikevitch et al. |
| 2010/0046234 A1 | 2/2010 | Abu-Ageel |
| 2010/0046245 A1 | 2/2010 | Ansari et al. |
| 2010/0073600 A1 | 3/2010 | Itoh et al. |
| 2010/0091516 A1 | 4/2010 | Haerle et al. |
| 2010/0096967 A1 | 4/2010 | Marinus et al. |
| 2010/0102250 A1 | 4/2010 | Li et al. |
| 2010/0103966 A1 | 4/2010 | Mizushima et al. |
| 2010/0164365 A1 | 7/2010 | Yoshino et al. |
| 2010/0171440 A1 | 7/2010 | Satou et al. |
| 2010/0202129 A1 | 8/2010 | Abu-Ageel |
| 2010/0202152 A1 | 8/2010 | Nakada |
| 2010/0254153 A1 | 10/2010 | Hama et al. |
| 2011/0044070 A1 | 2/2011 | Takahashi |
| 2011/0063874 A1 | 3/2011 | Yatsuda et al. |
| 2011/0068360 A1 | 3/2011 | Nago et al. |
| 2011/0068679 A1 | 3/2011 | Sawamura et al. |
| 2011/0148280 A1 | 6/2011 | Kishimoto et al. |
| 2011/0176305 A1 | 7/2011 | Schallmoser |
| 2011/0182072 A1 | 7/2011 | Shimizu et al. |
| 2011/0248624 A1 | 10/2011 | Kishimoto et al. |
| 2011/0279007 A1 | 11/2011 | Kishimoto |
| 2011/0279039 A1 | 11/2011 | Kishimoto |
| 2011/0280032 A1 | 11/2011 | Kishimoto |
| 2011/0280033 A1 | 11/2011 | Kishimoto et al. |
| 2011/0280039 A1 | 11/2011 | Kishimoto |
| 2012/0026503 A1 | 2/2012 | Lewandowski et al. |
| 2012/0026721 A1 | 2/2012 | Kurt et al. |
| 2012/0106178 A1 | 5/2012 | Takahashi et al. |

FOREIGN PATENT DOCUMENTS

| | | |
|---|---|---|
| CN | 101226978 | 7/2008 |
| CN | 101627481 | 1/2010 |
| EP | 2 280 214 | 2/2011 |
| JP | 60-186076 | 9/1985 |
| JP | 62-254355 | 11/1987 |
| JP | 4-43529 | 2/1992 |
| JP | 4-73801 | 3/1992 |
| JP | 6-203606 | 7/1994 |
| JP | 7-282609 | 10/1995 |
| JP | 7-318998 | 12/1995 |
| JP | 7-335016 | 12/1995 |
| JP | 8-185703 | 7/1996 |
| JP | 8-264885 | 10/1996 |
| JP | 9-10238 | 1/1997 |
| JP | 10-326520 | 12/1998 |
| JP | 11-195303 | 7/1999 |
| JP | 2000-81516 | 3/2000 |
| JP | 2000-231905 | 8/2000 |
| JP | 2001-15839 | 1/2001 |
| JP | 2001-127002 | 5/2001 |
| JP | 2001-264832 | 9/2001 |
| JP | 2002-100214 | 4/2002 |
| JP | 2002-323726 | 11/2002 |
| JP | 2003-69086 | 3/2003 |
| JP | 2003-509821 | 3/2003 |
| JP | 2003-295319 | 10/2003 |
| JP | 2003-332237 | 11/2003 |
| JP | 2004-87435 | 3/2004 |
| JP | 2004-87925 | 3/2004 |
| JP | 2004-115304 | 4/2004 |
| JP | 2004-200531 | 7/2004 |

(56) References Cited

FOREIGN PATENT DOCUMENTS

| | | |
|---|---|---|
| JP | 2004-241142 | 8/2004 |
| JP | 2004-301977 | 10/2004 |
| JP | 2004-327361 | 11/2004 |
| JP | 2005-19981 | 1/2005 |
| JP | 2005-055199 | 3/2005 |
| JP | 2005-56852 | 3/2005 |
| JP | 2005-56952 | 3/2005 |
| JP | 2005-109402 | 4/2005 |
| JP | 2005-150041 | 6/2005 |
| JP | 2005-157251 | 6/2005 |
| JP | 2005-175111 | 6/2005 |
| JP | 2005-294185 | 10/2005 |
| JP | 2005-311170 | 11/2005 |
| JP | 2005-347223 | 12/2005 |
| JP | 2006-40843 | 2/2006 |
| JP | 2006-61685 | 3/2006 |
| JP | 2006-100287 | 4/2006 |
| JP | 2006-154408 | 6/2006 |
| JP | 2006-164796 | 6/2006 |
| JP | 2006-521667 | 9/2006 |
| JP | 2006-296498 | 11/2006 |
| JP | 2006-351369 | 12/2006 |
| JP | 2007-65600 | 3/2007 |
| JP | 2007-66911 | 3/2007 |
| JP | 2007-88078 | 4/2007 |
| JP | 2007-95931 | 4/2007 |
| JP | 2007-142452 | 6/2007 |
| JP | 2007-157548 | 6/2007 |
| JP | 2007-515270 | 6/2007 |
| JP | 2007-173177 | 7/2007 |
| JP | 2007-173595 | 7/2007 |
| JP | 2007-196224 | 8/2007 |
| JP | 2007-258019 | 10/2007 |
| JP | 2007-294754 | 11/2007 |
| JP | 2007-323858 | 12/2007 |
| JP | 2008-10518 | 1/2008 |
| JP | 2008-27910 | 2/2008 |
| JP | 2008-66297 | 3/2008 |
| JP | 2008-124504 | 5/2008 |
| JP | 2008-129683 | 6/2008 |
| JP | 2008-135261 | 6/2008 |
| JP | 2008-135411 | 6/2008 |
| JP | 2008-145838 | 6/2008 |
| JP | 2008-150518 | 7/2008 |
| JP | 2008-234018 | 10/2008 |
| JP | 2008-243714 | 10/2008 |
| JP | 2008-243904 | 10/2008 |
| JP | 2008-262910 | 10/2008 |
| JP | 2008-270229 | 11/2008 |
| JP | 2008-277447 | 11/2008 |
| JP | 2009-19573 | 1/2009 |
| JP | 2009-21506 | 1/2009 |
| JP | 2009-70766 | 4/2009 |
| JP | 2009-104913 | 5/2009 |
| JP | 2009-104933 | 5/2009 |
| JP | 2009-108327 | 5/2009 |
| JP | 2009-129590 | 6/2009 |
| JP | 2009-129683 | 6/2009 |
| JP | 2009-140874 | 6/2009 |
| JP | 2009-523308 | 6/2009 |
| JP | 2009-176443 | 8/2009 |
| JP | 2009-180935 | 8/2009 |
| JP | 2009-224053 | 10/2009 |
| JP | 2009-266437 | 11/2009 |
| JP | 2009-541950 | 11/2009 |
| JP | 2009-289537 | 12/2009 |
| JP | 2009-289976 | 12/2009 |
| JP | 2010-15902 | 1/2010 |
| JP | 2010-62108 | 3/2010 |
| JP | 2010-80306 | 4/2010 |
| JP | 2010-102913 | 5/2010 |
| JP | 2010-182574 | 8/2010 |
| JP | 2010-186886 | 8/2010 |
| JP | 2011-65979 | 3/2011 |
| JP | 2011-108961 | 6/2011 |
| KR | 10-665221 | 12/2006 |
| WO | WO-2004/081140 | 9/2004 |
| WO | WO-2006/038502 | 4/2006 |
| WO | WO-2006/098267 | 9/2006 |
| WO | WO-2008/117211 | 10/2008 |
| WO | WO-2009/031289 | 3/2009 |
| WO | WO-2009/145141 | 12/2009 |
| WO | WO-2010/003763 | 1/2010 |
| WO | WO-2010/047882 | 4/2010 |
| WO | WO-2010/116305 | 10/2010 |

OTHER PUBLICATIONS

Kishimoto et al., U.S. Office Action mailed Jun. 18, 2012, directed to U.S. Appl. No. 13/081,295; 9 pages.

Sasaki, M. (2005). "Applications of White LED Lighting to Automobile Onboard Devices". *Oyo Buturi.* 74(11):1463-1466.

Public Notice Specifying Details of Safety Standards for Road Vehicle, Appendix 51 (Specified Standards for Style of Headlamp), Sep. 26, 2003; pp. 1-17 with Partial English translation of relevant portions (5 pages).

Kishimoto et al., U.S. Office Action mailed Dec. 4, 2012, directed to U.S. Appl. No. 13/081,295; 11 pages.

Kishimoto, U.S. Office Action mailed Dec. 21, 2012, directed to U.S. Appl. No. 13/108,764; 13 pages.

Kishimoto et al., U.S. Office Action mailed Sep. 21, 2012, directed to U.S. Appl. No. 12/957,998; 8 pages.

Kishimoto, U.S. Office Action mailed Feb. 20, 2013, directed to U.S. Appl. No. 13/107,440; 11 pages.

Kishimoto, U.S. Advisory Action mailed Feb. 25, 2013, directed to U.S. Appl. No. 13/081,295; 4 pages.

Kishimoto et al., U.S. Office Action mailed Mar. 19, 2013, directed to U.S. Appl. No. 13/107,449; 10 pages.

Kishimoto et al., U.S. Advisory Action dated Nov. 30, 2012, directed to U.S. Appl. No. 12/957,998; 3 pages.

Xie, R. et al. (2007). "Silicon-based Oxynitride and Nitride Phosphors for White LEDs—A Review," *Science and Technology of Advanced Materials* 8: 588-600.

Kishimoto, U.S. Office Action mailed Jul. 22, 2013, directed to U.S. Appl. No. 13/104,517; 11 pages.

Kishimoto, U.S. Office Action mailed Aug. 30, 2013, directed to U.S. Appl. No. 13/108,764; 16 pages.

Kishimoto et al., U.S. Office Action mailed Sep. 6, 2013, directed to U.S. Appl. No. 13/945,673; 9 pages.

Kishimoto, U.S. Office Action mailed May 9, 2013, directed to U.S. Appl. No. 13/108,770; 14 pages.

Kishimoto et al., U.S. Office Action mailed Aug. 14, 2013, directed to U.S. Appl. No. 13/107,449; 12 pages.

Kishimoto, U.S. Office Action mailed Jun. 7, 2013, directed to U.S. Appl. No. 13/108,764; 13 Pages.

Kishimoto, U.S. Office Action mailed Jul. 3, 2013, directed to U.S. Appl. No. 13/107,440; 13 pages.

Kishimoto et al., U.S. Advisory Action mailed Nov. 5, 2013, directed to U.S. Appl. No. 13/107,449; 4 pages.

Kishimoto, U.S. Office Action mailed Jan. 3, 2014, directed to U.S. Appl. No. 13/107,440; 11 pages.

Kishimoto, Notice of Allowance mailed Jan. 17, 2014, directed to U.S. Appl. No. 13/108,770; 7 pages.

Kishimoto et al., U.S. Office Action mailed Feb. 10, 2014, directed to U.S. Appl. No. 13/945,673; 7 pages.

Kishimoto, U.S. Office Action mailed Feb. 20, 2014, directed to U.S. Appl. No. 14/091,980; 6 pages.

(56) References Cited

OTHER PUBLICATIONS

Takahashi et al., U.S. Restriction Requirement mailed Mar. 20, 2014, directed to U.S. Appl. No. 13/238,995; 6 pages.
Kishimoto et al., U.S. Advisory Action mailed May 29, 2014, directed to U.S. Appl. No. 13/945,673; 3 pages.
Kishimoto, U.S. Office Action mailed Jun. 6, 2014, directed to U.S. Appl. No. 14/091,980; 8 pages.
Takahashi et al., U.S. Office Action mailed May 22, 2014, directed to U.S. Appl. No. 13/238,995; 8 pages.
Kishimoto et al., U.S. Office Action mailed Jun. 19, 2014, directed to U.S. Appl. No. 13/081,295; 8 pages.
Kishimoto, U.S. Office Action mailed Jul. 14, 2014, directed to U.S. Appl. No. 13/107,440; 15 pages.
Kishimoto et al., U.S. Notice of Allowance mailed Jul. 15, 2014, directed to U.S. Appl. No. 13/945,673; 11 pages.

* cited by examiner

FIG. 9 (a)
| | POWER CONSUMPTION (W) | LUMINOUS FLUX (lm) | LUMINANCE (Mcd/m²) | LIFE (HOUR) |
|---|---|---|---|---|
| LASER ILLUMINATING DEVICE | <35 | >2000 | 100 | >10000 |
| WHITE LED | 45 | 400~500×5 | 25 | 10000 |
| HALOGEN LAMP | 55 | 700~1500 | 25 | 1000 |
| HID | 43 (WITH BALLAST) | 3200 | 80 | 2000 |
FIG. 9 (b)
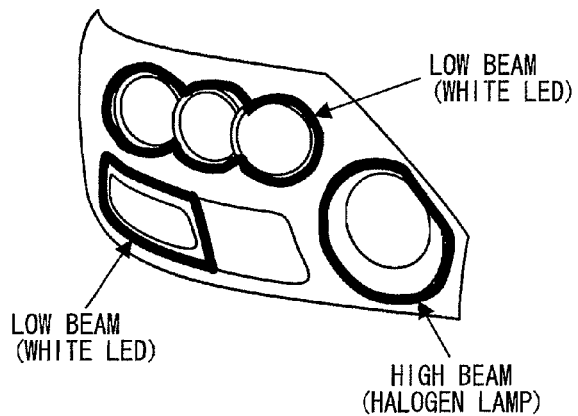
FIG. 9 (c)
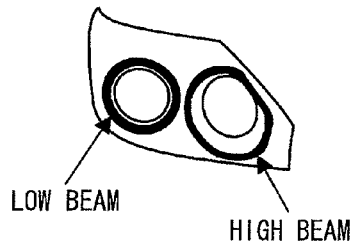

LIGHT EMITTING DEVICE, WITH LIGHT GUIDE MEMBER HAVING SMALLER EXIT SECTION, AND ILLUMINATING DEVICE, AND VEHICLE HEADLIGHT INCLUDING THE SAME

This Nonprovisional application claims priority under 35 U.S.C. §119(a) on Patent Application No. 2010-028176 filed in Japan on Feb. 10, 2010, the entire contents of which are hereby incorporated by reference.

TECHNICAL FIELD

The present invention relates to (i) a light emitting device and an illuminating device each of which includes an excitation light source and a light emitting section containing a fluorescent substance and (ii) a vehicle headlight including the light emitting device or the illuminating device.

BACKGROUND ART

In these years, diligent studies have been carried out on a light emitting device in which a semiconductor light emitting element (solid-state light source) such as a light emitting diode (LED) or a laser diode (LD) is used as an excitation light source.

As an example of such a conventional light emitting device, Patent Literature 1 discloses a technique in which a single optical fiber is used.

According to the technique disclosed in Patent Literature 1, a normal optical fiber is used as a light guide member. Accordingly, the optical fiber naturally has a light incidence section and a light exit section which have identical cross-sectional areas.

On the other hand, as another examples of the conventional light emitting device, Patent Literatures 2 and 3 disclose techniques in which a bundle fiber made up of a plurality of bundled optical fibers is used.

According to the technique disclosed in Patent Literatures 2 and 3, a plurality of excitation light sources emit rays of light which are bundled with the use of the bundle fiber so as to generate high-power light.

Note that the techniques disclosed in Patent Literatures 2 and 3 are different from that of Patent Literature 1 in that a plurality of optical fibers are used in the technique disclosed in Patent Literatures 2 and 3. However, the bundle fiber is made up of a plurality of bundled optical fibers as described above. Accordingly, in general, the bundle fiber has a light incidence section and a light exit section which have identical cross-sectional areas as disclosed in Patent Literature 2.

Note that, according to the technique disclosed in Patent Literature 3, a light exit section has a cross-sectional area which is larger than that of a light incidence section. However, rays of light emitted from an emission edge of the bundle fiber are converged with the use of a convex lens, and thereby a problem is solved that the light exit section has the cross-sectional area larger than that of the light incidence section.

CITATION LIST

Patent Literature

Patent Literature 1
Japanese Patent Application Publication, Tokukaihei, No. 7-318998 (Publication Date: Dec. 8, 1995)
Patent Literature 2
Japanese Patent Application Publication, Tokukai, No. 2004-87925 (Publication Date: Mar. 18, 2004)
Patent Literature 3
Japanese Patent Application Publication, Tokukai, No. 2001-15839 (Publication Date: Jan. 19, 2001)

SUMMARY

Technical Problem

However, such a conventional light emitting device in which a single optical fiber or a bundle fiber is used as the light guide member has problems as discussed below.

First, the conventional optical fiber has the light incidence section and the light exit section which have identical cross-sectional areas. However, the conventional optical fiber emits light which spreads to some extent with respect to a cross-sectional diameter of the conventional optical fiber (see FIG. 10(a)) since the conventional optical fiber guides excitation light while utilizing a total reflection of light. According to this configuration, in a case where a size of the light emitting section is thoroughly small, an irradiation range of the excitation light becomes larger than the light emitting section. This causes a problem that a luminous efficiency is decreased.

On the other hand, according to the conventional bundle fiber, a plurality of optical fibers which are connected to respective of the plurality of excitation light sources are bundled so as to converge rays of light generated by the plurality of excitation light sources. Accordingly, as the number of the excitation light sources increases, the number of the optical fibers to be bundled increases.

This causes a problem that an irradiation range of light emitted from an emission edge of the bundle fiber becomes larger as the number of the excitation light sources increases (see FIG. 10(b)).

Note that the irradiation range does not spread in proportion to the number of the optical fibers but becomes larger than at least an irradiation range of light emitted from an emission edge of a single optical fiber.

Specifically, the conventional light emitting device has a problem that the irradiation range of the excitation light inevitably becomes larger than the size of the light emitting section eventually, as the number of the excitation light sources are increased so as to obtain higher-power light.

On the other hand, according to the technique disclosed in Patent Literature 3 as described above, the light emitted from the emission edge of the bundle fiber is converged with the use of the convex lens, and the bundle fiber has the light incidence section and the light exit section which have identical cross-sectional areas. This causes a problem that the emitted light cannot be converged within a range which is smaller than a range defined by a distance between lines extended from central axes of respective two optical fibers having cores which are most distant from each other among the plurality of optical fibers (see FIG. 10(c)).

Note that the inventors of the present invention originally found the problem that the irradiation range of the excitation light becomes larger than the size of the light emitting section in the case where the bundle fiber is used. As far as the inventors know, there is no document in which the problem is clearly addressed.

The present invention is accomplished in view of the conventional problems, and its object is to provide a light emitting device, etc. which prevents the irradiation range of the excitation light from becoming larger than the size of the light emitting section.

Solution to Problem

In order to attain the object, a light emitting device of the present invention includes: an excitation light source which generates excitation light; a light emitting section from which light is emitted in response to the excitation light; and a light guide irradiation member, having one end and the other end, which (i) guides the excitation light, entered via the one end, toward the other end and (ii) irradiates a predetermined light irradiation area of the light emitting section with the excitation light thus guided, the other end having a cross-sectional area which is smaller than that of the one end.

According to the configuration, the light emitting section emits light in response to the excitation light. Accordingly, the light emitting section includes at least a fluorescent substance which emits light in response to the excitation light.

According to the configuration, the light guide irradiation member (i) guides the excitation light, entered via the one end, toward the other end and (ii) irradiates a predetermined light irradiation area of the light emitting section with the excitation light thus guided.

Moreover, the other end of the light guide irradiation member has a cross-sectional area which is smaller than that of the one end.

This allows the predetermined light irradiation area of the light emitting section to be irradiated with the excitation light which has been guided to the other end, which has the cross-sectional area smaller than that of the one end, of the light guide irradiation member.

Further, the cross-sectional area of the other end can be reduced so as to make small the spreading of the irradiation range of the excitation light on the other end or in the vicinity of the other end, even in a case where the size of the light emitting section is small. This makes it possible to prevent the irradiation range of the excitation light from becoming larger than the size of the light emitting section.

With the configuration, it is possible to provide the light emitting device which prevents the irradiation range of the excitation light from becoming larger than the size of the light emitting section.

Note that Patent Literature 1 discloses an optical fiber as an example of a member (hereinafter, referred to as a light guide member) which guides excitation light from the excitation light source to the light emitting section. However, Patent Literature 1 is completely silent about a configuration such as the light guide irradiation member of the present invention.

Patent Literatures 2 and 3 disclose a light guide member made up of a plurality of bundled optical fibers. According to the light guide member, a cross-sectional area of an incidence edge of the light guide member is identical to that of the emission edge. This configuration is different from that of the light guide irradiation member of the present invention.

The "excitation light source" can be a member such as an LD which generates a coherent laser beam. Alternatively, the "excitation light source" can be a member such as an LED which generates incoherent excitation light.

In a case where the "excitation light source" is made up of a solid-state light source such as an LD chip or an LED chip, the excitation light source can be a solid-state light source with a single stripe per chip. Alternatively, the excitation light source can be a solid-state light source with plural stripes per chip.

The "light emitting section" includes at least a fluorescent substance as described above. That is, the "light emitting section" can be made up of only a single type of fluorescent substance or made up of plural types of fluorescent substances. Alternatively, the light emitting section can be configured by dispersing a single type or plural types of fluorescent substance(s) in an appropriate dispersion medium.

The "fluorescent substance" is a substance in which an electron in a low-energy state is excited into a high-energy state when the substance is irradiated with excitation light. The substance emits incoherent light when the electron is shifted from the high-energy state to the low-energy state.

The term "irradiation" encompasses (i) a case where the light irradiation area is irradiated with the excitation light while the size of the irradiation range is substantially being kept unchanged, (ii) a case where the light irradiation area is irradiated with the excitation light while the irradiation range is spreading, and (iii) a case where the light irradiation area is irradiated with the excitation light while the irradiation range is being reduced.

Advantageous Effects of Invention

As described above, the light emitting device of the present invention includes: an excitation light source which generates excitation light; a light emitting section from which light is emitted in response to the excitation light; and a light guide irradiation member, having one end and the other end, which (i) guides the excitation light, entered via the one end, toward the other end and (ii) irradiates a predetermined light irradiation area of the light emitting section with the excitation light thus guided, the other end having a cross-sectional area which is smaller than that of the one end.

This configuration brings about an effect of preventing the irradiation range of the excitation light from becoming larger than the size of the light emitting section.

For a fuller understanding of the nature and advantages of the invention, reference should be made to the ensuing detailed description taken in conjunction with the accompanying drawings.

BRIEF DESCRIPTION OF DRAWINGS

FIG. 9(a) is a table illustrating comparisons of properties of different types of lamps.

FIG. 9(b) is a view illustrating an example of an exterior of a conventional car head lamp.

FIG. 9(c) is a view illustrating an example of an exterior of a car head lamp which is configured with the use of the light emitting device (illuminating device).

DESCRIPTION OF EMBODIMENTS

Figure 1:
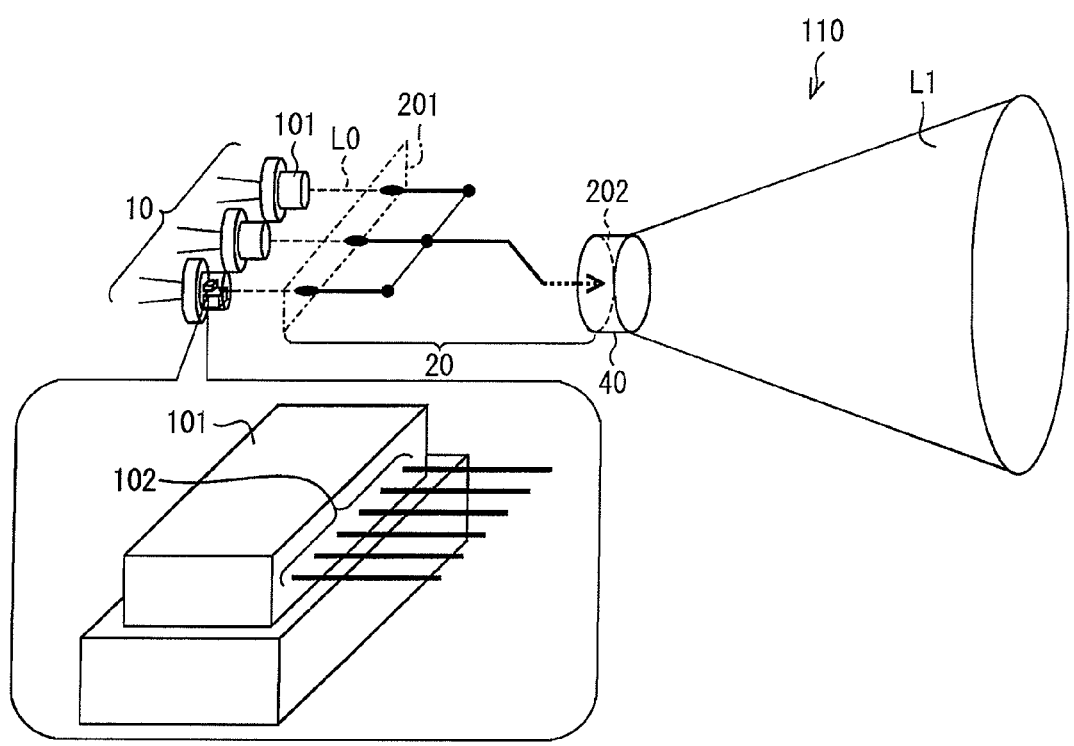
FIG. 1 is a schematic view illustrating a brief configuration of a light emitting device in an embodiment of the present invention.

The following describes an embodiment of the present invention with reference to FIG. 1 through FIG. 9(c). As to configurations which are not described in a section below, descriptions of such configurations are sometimes omitted as appropriate. Note, however, that such configurations are identical to those described in the other sections. For convenience, the same reference numerals are given to members having functions identical to those described in the other sections, and descriptions of the members are omitted as appropriate.

Note that each of a light emitting device (illuminating device, vehicle headlight) 110, a light emitting device (illuminating device, vehicle headlight) 120A, a light emitting device (illuminating device, vehicle headlight) 120B, and an illuminating device (light emitting device, vehicle headlight) 140 is described as a light emitting device part of an illuminating device or a vehicle headlight. However, embodiments of the present invention are not limited to this, but each of the light emitting device and the illuminating device of the present invention can be used as a light emitting device part of a device such as a lighting device or a lighting equipment, other than the illuminating device or the vehicle headlight.

[1. Brief Configuration of Light Emitting Device]

The following describes a brief configuration of the light emitting device 110 which is an embodiment of the present invention, with reference to FIG. 1.

FIG. 1 is a schematic view illustrating a brief configuration of the light emitting device 110 which is an embodiment of the present invention.

The light emitting device 110 emits incoherent light (light) L1. The light emitting device 110 includes a laser diode group (excitation light source) 10, a light guide irradiation section (light guide irradiation member) 20, and a cylindrical light emitting element (light emitting section) 40 (see FIG. 1).

The laser diode group 10 includes three LD chips (excitation light sources) 101. Each of the LD chips 101 is a semiconductor laser device (solid laser device) with six stripes per chip, i.e., each of the LD chips 101 has six light emitting points (excitation light sources) 102. Each of the LD chips 101 is mounted in a stem with a diameter of 9 mm, and has optical power of 3.0 W. Further, each of the LD chips 101 is driven at an operating voltage of 5V and a current of 1.92 A.

Each of the light emitting points 102 emits a laser beam (excitation light) L0 whose oscillation wavelength is 405 nm.

Note that the oscillation wavelength of the laser beam L0 is not limited to 405 nm, provided that the oscillation wavelength falls within a blue-violet range or a blue range (i.e., 380 nm or more but 490 nm or less).

It is difficult for an existing technique to realize a high-quality short-wavelength semiconductor laser with a wavelength of 380 nm or less. However, in the future, it is possible to use an LD chip 101, as a light source, which is designed to oscillate at a wavelength of 380 nm or less.

The three LD chips 101 consume 28.8 W in total in a case where the three LD chips 101, each driven at output power of 3.0 W (9.0 W in total of the three LD chips 101), are used.

By simple calculation, a total of luminous fluxes of the three LD chips 101 serves as a luminous flux of the entire light sources. Accordingly, the entire light sources can have a luminous flux which is approximately three times larger, as compared with a case where only a single LD chip 101 is used, provided that the LD chips 101 have identical performances.

Note that, according to the present embodiment, the number of the LD chips 101 which constitute the laser diode group 10 is three (3). However, the number of the LD chips 101 is not limited to this, but can be 1, 2, or 4 or more.

The excitation light source can be a solid-state light source with plural stripes per chip in which a plurality of excitation light sources (light emitting points 102) are integrated as with the LD chip 101 of the present embodiment. Alternatively, the excitation light source can be a solid-state light source with a single stripe per chip as with an LD chip 11 which is to be described later.

Moreover, the excitation light source can generate a coherent laser beam L0 as with the LD chip 101 of the present embodiment. Alternatively, the excitation light source can generate incoherent excitation light as with an LED lamp (excitation light source) 13 which is to be described later.

The plurality of excitation light sources can be made up of only LD(s) or LED(s) as described above. Alternatively, the plurality of excitation light sources can be made up of LD(s) and LED(s).

The light guide irradiation section 20 (i) guides each of the laser beams L0, entered via a light incidence plane (one end) 201, toward a light irradiation plane (the other end) 202, and then (ii) irradiates a light irradiation area of the cylindrical light emitting element 40 with the laser beams L0 thus guided, in the vicinity of the light irradiation plane 202 or on the light irradiation plane 202.

The light irradiation plane 202 of the light guide irradiation section 20 has a cross-sectional area which is smaller than that of the light incidence plane 201.

This allows the light irradiation area of the cylindrical light emitting element 40 to be irradiated with the laser beams L0 guided to the light irradiation plane 202, which has a cross-sectional area smaller than that of the light incidence plane 201.

The term "irradiation" encompasses (i) a case where the light irradiation area is irradiated with the laser beams L0 while a size of an irradiation range is substantially being kept unchanged, (ii) a case where the light irradiation area is irradiated with the laser beams L0 while the irradiation range is spreading, and (iii) a case where the light irradiation area is irradiated with the laser beams L0 while the irradiation range is being reduced.

According to the present embodiment, the light irradiation plane 202 of the light guide irradiation section 20 is in contact with the light irradiation area which has a size approximately identical to that of the light irradiation plane 202.

Accordingly, the light irradiation area of the cylindrical light emitting element 40 is irradiated with the laser beams L0 while the size of the irradiation range of the laser beams L0 on the light irradiation plane 202 is kept substantially unchanged.

According to the configuration, even in a case where the size of the cylindrical light emitting element 40 is small, it is possible to make small the spreading of the irradiation range of the laser beams L0 on the light irradiation plane 202 or in the vicinity of the light irradiation plane 202, by reducing the cross-sectional area of the light irradiation plane 202. This makes it possible to prevent the irradiation range of the laser beams L0 from becoming larger than the size of the cylindrical light emitting element 40.

It is therefore possible to provide the light emitting device 110 which prevents the irradiation range of the laser beams L0 from becoming larger than the size of the cylindrical light emitting element 40.

Moreover, it is possible to spatially separate the laser diode group 10 from the cylindrical light emitting element 40 at an arbitrary distance by adjusting a distance from the light incidence plane 201 of the light guide irradiation section 20 to the light irradiation plane 202. This makes it possible to prevent the cylindrical light emitting element 40 from being deteriorated due to heat generated by the laser diode group 10.

Each of the light emitting points 102 of the LD chip 101 emits the oscillating laser beam L0 which is coherent light having a high directivity. This allows the light emitting device 110 to utilize the laser beams L0, as excitation light, which are efficiently converged by the light guide irradiation section 20.

Accordingly, it is possible to provide an extremely small cylindrical light emitting element 40 regardless of the number of the LD chips 101. As a result, it is possible to realize the light emitting device 110 which achieves a ultrahigh luminance and is small in size.

Various kinds of advantageous effects such as a size-reduction of various kinds of lighting equipments can be brought about, for example by applying, to the various kinds of lighting equipments, the light emitting device 110 which includes the LD chip(s) 101 as the excitation light source.

Note that the light guide irradiation section 20 shown in FIG. 1 does not concretely show how the laser beams L0 are guided from the light incidence plane 201 toward the light irradiation plane 202.

However, the light guide irradiation section 20 can be exemplified by two types of concrete examples.

According to a first type, the light guide irradiation section 20 is made up of a single light guide irradiation member which has one end and the other end whose cross-sectional area is smaller than that of the one end.

The first type of the light guide irradiation section 20 encompasses, for example, an elliptic truncated conic light converging section (light guide irradiation member) 21 which is described later.

According to a second type, the light guide irradiation section 20 is made up of a plurality of light guide irradiation members each of which has one end and the other end whose cross-sectional area is smaller than that of the one end.

The second type of the light guide irradiation section 20 encompasses, for example, circular truncated conic light converging sections (light guide irradiation member) 22A through 22C which are described later.

Note that more concrete configurations of the light guide irradiation section 20 are described later.

The cylindrical light emitting element 40 emits incoherent light L1 in response to the laser beams L0. That is, the cylindrical light emitting element 40 contains at least a fluorescent substance which emits incoherent light L1 when the fluorescent substance is irradiated with the laser beams L0.

The cylindrical light emitting element 40 of the present embodiment has a discoid (cylindrical) shape with a diameter of 2 mm and a thickness of 1 mm.

Note that, in a case where the light emitting device of the present invention is used as a car head lamp, the light emitting section can have another shape such as, for example, a horizontally long rectangular parallelepiped shape with an approximate size of width×depth×height=3 mm×1 mm×1 mm, as with a rectangular parallelepiped light emitting element (light emitting section) 41 which is described later.

The cylindrical light emitting element 40 includes at least a fluorescent substance as described above. Note that the fluorescent substance encompasses a single type of fluorescent substance and a plurality of types of fluorescent substances.

Each of the single type of fluorescent substance and the plurality of types of fluorescent substances can be dispersed in an appropriate dispersion medium. It is preferable that the dispersion medium is a solid. However, in a case where the fluorescent substance(s) is sealed in a light-transmitting cylindrical container, the dispersion medium can be a liquid.

It is preferable that the dispersion medium is a light-transmitting resin material such as a silicone resin. The silicone resin and the fluorescent substance are mixed at a weight ratio of approximately 10:1. Note that the dispersion medium is not limited to the silicone resin but can be (i) a glass material such as an inorganic glass material or (ii) an organic-inorganic hybrid material.

Since the laser beams L0 are thus converged and emitted (or guided and emitted) by the light guide irradiation section 20, the light emitting device 110 can emit the laser beams L0 in accordance with a size of the light irradiation area of the cylindrical light emitting element 40.

Further, since the light emitting device 110 can emit most of the converged laser beams L0, a low-energy state electron is excited, in the fluorescent substance(s) contained in the cylindrical light emitting element 40, so as to be in a high-energy state in response to the laser beams L0 with which the fluorescent substance(s) is irradiated.

This causes the incoherent light L1 to be emitted from the cylindrical light emitting element 40 in response to the laser beams L0 thus emitted. It is therefore possible to achieve a light emitting device 110 which emits light with a higher luminous flux and higher luminance, as compared with a light emitting device in which a single LD chip 101 is employed.

As is clear from above, it is possible to provide a light emitting device 110 (i) which achieves a high luminous flux, a high luminance, and long life and (ii) which can prevent the spreading of the irradiation range of the laser beams L0 from becoming larger than the size of the cylindrical light emitting element 40 (light irradiation area).

Note that the "fluorescent substance" means a substance which emits incoherent light L1 when a transition of an electron, which is excited so that a transition occurs to a high-energy state from a low-energy state in response to the laser beams L0, to a low-energy state occurs.

It is preferable that a sialon fluorescent substance (oxynitride fluorescent substance) or a III-V compound semiconductor nanoparticle fluorescent substance is employed as the fluorescent substance. Instead, another fluorescent substance, such as a yttrium(Y)-aluminum(Al)-garnet(G) fluorescent substance which is activated by cerium (Ce) (YAG:Ce), can be employed as the fluorescent substance.

The sialon can be classified by its crystal structure into an α-type and a β-type, as with silicon nitride. In particular, an α-sialon has a unit structure which (i) is made up of 28 atoms indicated by a general formula $Si_{12-(m+n)}Al_{(m+n)}O_nN_{16-n}$ (m+n<12, 0<m, n<11; each of m and n is an integer) and (ii) has two gaps where various metals can be put so that the α-sialon becomes an interstitial solid solution. It is possible to obtain a fluorescent substance by employing a rare-earth element as the various metals. In a case where calcium (Ca) and europium (Eu) are employed as the various metals, it is possible to obtain a high-quality fluorescent substance which emits light having a wavelength which falls within a range between yellow and orange, which wavelength is longer than that of the YAG:Ce.

Moreover, the sialon fluorescent substance can be excited by light whose wavelength falls within a blue-violet range or a blue range (i.e., 380 nm or more but 490 nm or less), and therefore the sialon fluorescent substance is suitably used as a fluorescent substance of a white LED.

The following describes how the sialon fluorescent substance is synthesized. A composition of the sialon fluorescent substance is indicated by a general formula $Ca_pSi_{12-(m+n)}Al_{(m+n)}O_nN_{16-n}:Eu_q$ (p and q are solubilities of Ca and Eu, respectively; m+n<12; 0<m; n<11; each of m and n is an integer). Optimal amounts of the respective solubilities p and q are obtained in advance by experiments, and m and n are determined based on factors such as conditions of maintaining a neutrality of an electric charge.

Powders of silicon nitride ($Si_3N_4$), aluminum nitride (AlN), calcium carbonate ($CaCO_3$), and europium oxide ($Eu_2O_3$) are used as a starting material. The powders are weighed and mixed, are subjected to pressure sintering with nitrogen gas at a sintering temperature of 1700° C., and are then reduced to powder so as to obtain a sialon fluorescent substance.

The sialon fluorescent substance is a fluorescent substance which has high deterioration resistance to the laser beams L0. In theory, it is therefore possible to effectively prevent deterioration of the cylindrical light emitting element 40 in a case where the cylindrical light emitting element 40 is made of only the sialon fluorescent substance.

Note that it is believed that the deterioration of the cylindrical light emitting element 40 is caused by the deterioration of a dispersion medium (e.g., a silicone resin) of a fluorescent substance contained in the cylindrical light emitting element 40. That is, while the sialon fluorescent substance is being irradiated with laser beams L0, the sialon fluorescent substance emits light at an efficiency of 60% to 80%, and the remaining 20% to 40% causes heat generation. It is believed that the heat deteriorates the dispersion medium.

Therefore, it is preferable to use a dispersion medium which has high thermal tolerance. Grass, for example, can be used as such a dispersion medium with high thermal tolerance.

It is known that white light can be made by mixing three colors which satisfy an isochromatic principle. It is possible to generate white light by appropriately selecting, based on the isochromatic principle, a color of the oscillated laser beam L0 of the LD chip 101 and a color of light emitted by the fluorescent substance.

For example, according to one of methods for causing the light emitting device 110 to emit white incoherent light L1, (i) a laser beam, whose oscillation wavelength falls within a blue-violet range (i.e., 380 nm or more but less than 420 nm), is employed as excitation light and (ii) an combination of a blue fluorescent substance, a green fluorescent substance, and a red fluorescent substance is employed as the fluorescent substance.

According to another one of the methods, (i) a laser beam, whose oscillation wavelength falls within a blue range (i.e., 440 nm or more but 490 nm or less), is employed as the excitation light and (ii) a yellow fluorescent substance or a combination of a green fluorescent substance and a red fluorescent substance is employed.

According to a further one of the methods, (i) LED light, whose oscillation wavelength falls within a blue range (i.e., 440 nm or more but 490 nm or less), is employed as the excitation light and (ii) a yellow fluorescent substance or a combination of a green fluorescent substance and a red fluorescent substance is employed.

Note that the yellow fluorescent substance emits light whose wavelength is 560 nm or more but 590 nm or less. The green fluorescent substance emits light whose wavelength is 510 nm or more but 560 nm or less. The red fluorescent substance emits light whose wavelength is 600 nm or more but 680 nm or less.

[2. Brief Configuration of Excitation Light Source]

Figure 2:
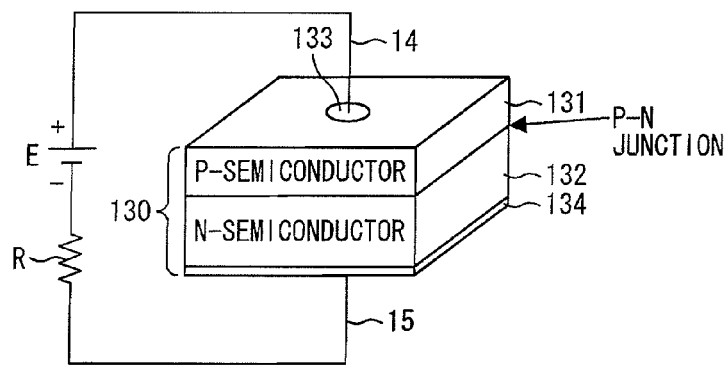
FIG. 2(a) is a circuit diagram illustrating an example of an excitation light source (LED), in relation to the light emitting device.
FIG. 2(b) is a schematic view illustrating an overview of the LED.
FIG. 2(c) is a circuit diagram illustrating another example of the excitation light source (LD).
FIG. 2(d) is a schematic view illustrating an overview of the LD.
Figure 2:
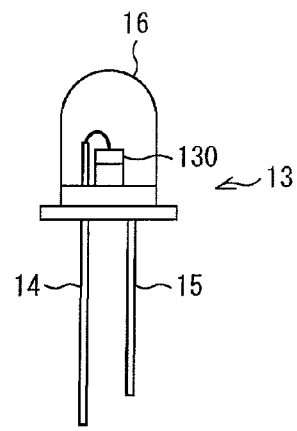
Figure 2:
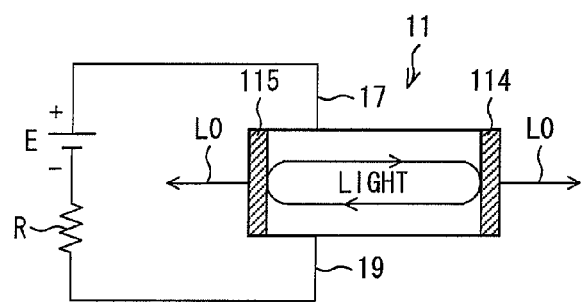
Figure 2:
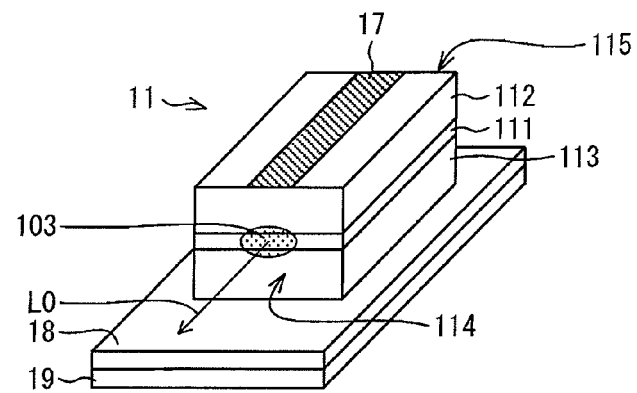

The following describes concrete examples of the excitation light source with reference to FIG. 2(*a*) through FIG. 2(*d*).

FIG. 2(*a*) is a circuit diagram illustrating an LED lamp (excitation light source) 13 which is an example of the excitation light source. FIG. 2(*b*) is a front view illustrating an overview of the LED lamp 13. FIG. 2(*c*) is a circuit diagram illustrating an LD chip (excitation light source) 11 which is another example of the excitation light source. FIG. 2(*d*) is a schematic view illustrating an overview of the LD chip 11.

The LED lamp 13 includes an LED chip (excitation light source) 130 which has an anode 14 and a cathode 15 and which is sealed in an epoxy resin cap 16 (see FIG. 2(*b*)).

The LED chip 130 has a p-n junction of a p-semiconductor 131 and an n-semiconductor 132. The cathode 15 is connected with a p-electrode 133, and the anode 14 is connected with an n-electrode 134. Note that the LD chip 101 is connected to a voltage supply E via a resistor R (see FIG. 2(*a*)).

The voltage supply E is provided between the anode 14 and the cathode 15 so as to constitute a circuit. While a voltage is being supplied across the LED chip 130 from the voltage supply E, incoherent excitation light is generated from the vicinity of the p-n junction.

The LED chip 130 can be made of a material such as a compound semiconductor. The compound semiconductor is exemplified by (i) GaP, AlGaAs, or GaAsP which emits red light, (ii) GaAsP which emits orange light, (iii) GaAsP or GaP which emits yellow light, (iv) GaP which emits green light, and (v) SiC or GaN which emits blue light.

Note that the LED chip 130 has features in which (i) it is driven at a low voltage of approximately 2 V to 4 V, (ii) it is small in size and lightweight, (iii) it responds quickly, (iv) it has a long life, and (v) it is available at low cost.

The LD chip 11 includes a cathode electrode 19, a substrate 18, a clad layer 113, an active layer 111, a clad layer 112, and an anode electrode 17 which are stacked in this order (see FIGS. 2(c) and 2(d)).

The substrate 18 is a semiconductor substrate, and it is preferable that the substrate 18 is made of GaN, sapphire, or SiC so as to obtain excitation light whose wavelength falls within a range between blue and ultraviolet and which excites the fluorescent substance as in the present invention. Besides, in general, a semiconductor laser substrate can be made of (i) an IV semiconductor such as Si, Ge, or SiC, (ii) a III-V compound semiconductor such as GaAs, GaP, InP, AlAs, GaN, InN, InSb, GaSb, or AlN, (iii) a II-VI compound semiconductor such as ZnTe, ZeSe, ZnS, or ZnO, (iv) an oxide insulator such as ZnO, $Al_2O_3$, $SiO_2$, $TiO_2$, $CrO_2$, or $CeO_2$, or (v) a nitride insulator such as SiN.

The anode electrode 17 is provided for causing a current to be applied to the active layer 111, via the clad layer 112.

The cathode electrode 19 is provided for causing the current to be applied to the active layer 111 from below the substrate 18, via the clad layer 113. Note that the current is applied while a forward bias voltage is being applied to the anode electrode 17 and the cathode electrode 19.

The active layer 111 is provided between the clad layer 113 and the clad layer 112.

A mixed crystal semiconductor which is made of AlInGaN is employed as each of the active layer 111 and the clad layers 112 and 113 so as to obtain excitation light whose wavelength falls in a range between blue and ultraviolet. In general, a mixed crystal semiconductor which is mainly composed of any combination of Al, Ga, In, As, P, N, and Sb is employed as each of an active layer and a clad layer of a semiconductor. Each of the active layer 111 and the clad layers 112 and 113 can be made up of such a mixed crystal semiconductor. Alternatively, each of the active layer 111 and the clad layers 112 and 113 can be made up of a II-VI compound semiconductor such as Zn, Mg, S, Se, Te, or ZnO.

In the active layer 111, light is generated in response to applied current, and the light thus generated is confined in the active layer 111 due to a difference of refractive index between the clad layer 112 and the clad layer 113.

Further, the active layer 111 has a front cleaved surface 114 and a rear cleaved surface 115 which face each other so as to confine light amplified by stimulated emission. Each of the front cleaved surface 114 and the rear cleaved surface 115 serves as a mirror.

Note that, unlike a normal mirror which completely reflects light, the light amplified by the stimulated emission partially transmits, as laser beams L0, the front cleaved surface 114 and the rear cleaved surface 115 (for convenience, the light is assumed to partially transmit the front cleaved surface 114 in this embodiment). Note also that the active layer 111 can have a multilayer quantum well structure.

Note that a reflection film (not illustrated) for laser oscillation is provided on the rear cleaved surface 115, which faces the front cleaved surface 114. The front cleaved surface 114 and the rear cleaved surface 115 have respective different reflectances so that most of the laser beam L0 is emitted from a low-reflectance edge surface (e.g., the front cleaved surface 114) via a light emitting point 103.

The semiconductor layers such as the clad layer 113, the clad layer 112, and the active layer 111 can be deposited by a general deposition method such as an MOCVD (metalorganic chemical vapor deposition), an MBE (molecular beam epitaxy), a CVD (chemical vapor deposition), a laser ablation, or a sputtering. The metal layers can be deposited by a general deposition method such as a vacuum deposition, a plating, a laser ablation, or a sputtering.

[3. Concrete Example of Light Emitting Device (Part 1)]

Figure 3:
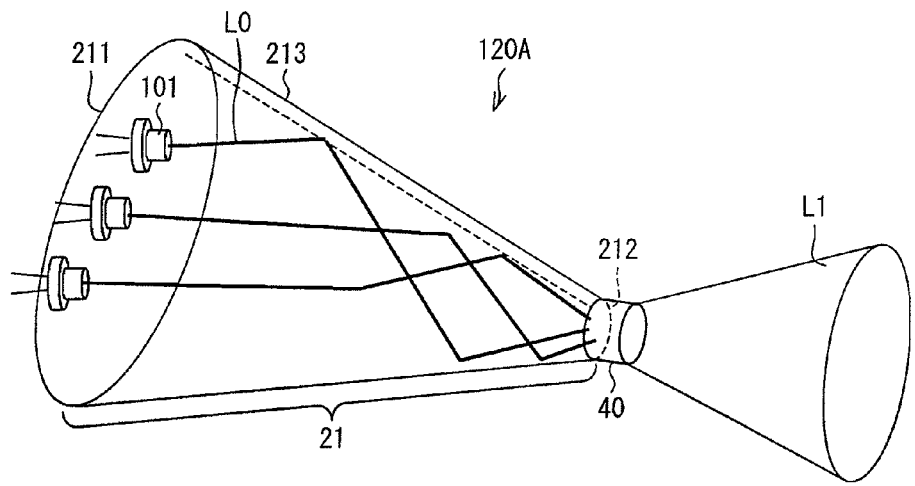
FIG. 3 is a schematic view illustrating another embodiment of the light emitting device.

The following describes how a light emitting device 120A is configured in another embodiment of the present invention, with reference to FIG. 3. Note that the light emitting device 120A is an embodied one of a light guide irradiation section 20 of the light emitting device 110.

FIG. 3 illustrates a configuration of the light emitting device 120A which includes an elliptic truncated conic light converging section (light guide irradiation member) 21, which is an example of the light guide irradiation section 20 of the light emitting device 110.

Note that the present embodiment discusses the elliptic truncated conic light converging section 21 merely as an example. However, a shape of the light converging section is not limited to this, but can be various shapes such as a circular truncated cone shape and a truncated pyramid shape.

The light emitting device 120A emits incoherent light (light) L1. The light emitting device 120A includes a laser diode group 10, an elliptic truncated conic light converging section 21, and a cylindrical light emitting element 40 (see FIG. 3).

As described above, the laser diode group 10 includes three LD chips 101. Each of the LD chips 101 is a semiconductor laser device (solid laser device) with six stripes per chip, i.e., each of the LD chips 101 has six light emitting points 102. Each of the LD chips 101 is mounted in a stem with a diameter of 9 mm, and has optical power of 3.0 W. Further, each of the LD chips 101 is driven at an operating voltage of 5V and a current of 1.92 A.

Each of the light emitting points 102 emits a laser beam L0 whose oscillation wavelength is 405 nm.

Note that the oscillation wavelength of the laser beam L0 is not limited to 405 nm, provided that the oscillation wavelength falls within a blue-violet range or a blue range (i.e., 380 nm or more but 490 nm or less).

The three LD chips 101 consume 28.8 W in total in a case where the three LD chips 101, each driven at output power of 3.0 W (9.0 W in total of the three LD chips 101), are used.

By simple calculation, a total of luminous fluxes of the three LD chips 101 serves as a luminous flux of the entire light sources. Accordingly, the entire light sources can have a luminous flux which is approximately three times larger, as compared with a case where only a single LD chip 101 is used, provided that LD chips 101 have identical performances.

Note that, according to the present embodiment, the number of the LD chips 101 which constitute the laser diode group 10 is three (3). However, the number of the LD chips 101 is not limited to this, but can be 1, 2, or 4 or more.

The excitation light source can be a solid-state light source with plural stripes per chip in which a plurality of excitation light sources (light emitting points 102) are integrated as with the LD chip 101 of the present embodiment. Alternatively, the excitation light source can be a solid-state light source with a single stripe per chip as with an LD chip 11 which is described above.

Moreover, the excitation light source can generate a coherent laser beam L0 as with the LD chip 101 of the present embodiment. Alternatively, the excitation light source can generate incoherent excitation light as with an LED lamp 13 described above.

The plurality of excitation light sources can be made up of only LD(s) or LED(s) as described above. Alternatively, the plurality of excitation light sources can be made up of LD(s) and LED(s).

The elliptic truncated conic light converging section 21 has a tapered elliptic cylinder shape and a surrounded structure in which the elliptic truncated conic light converging section 21 is configured so as to be surrounded by a lateral face (light reflective lateral face, surrounded structure) 213 of elliptic truncated cone, which lateral face 213 reflects laser beams L0 entered via a light incidence plane (one end) 211.

The elliptic truncated conic light converging section 21 has a light irradiation plane (the other end) 212 whose cross-sectional area is smaller than that of the light incidence plane 211. The laser beams L0 entered via the light incidence plane 211 are guided toward the light irradiation plane 212 by the lateral face 213 of elliptic truncated cone.

The lateral face 213 of elliptic truncated cone is provided so as to enclose (surround) all light paths of the respective laser beams L0 emitted from the laser diode group 10.

The "surrounded structure" can be exemplified by (i) a lateral face of a truncated cone such as a lateral face of a truncated pyramid or a lateral face of a circular truncated cone and (ii) the lateral face of the elliptic truncated cone of the present embodiment.

Each of the laser beams L0 can be guided toward the light irradiation plane 212 along a light path so that (i) a corresponding one of the laser beams L0 is reflected from the lateral face 213 only once, (ii) a corresponding one of the laser beams L0 is reflected from the lateral face 213 more than once, or (iii) a corresponding one of the laser beams L0 is never reflected from the lateral face 213.

The light incidence plane 211 has an elliptical shape with a diameter of approximately 10×30 mm. The light irradiation plane 202 has a circular shape with a diameter of approximately 2 mm.

With the configuration, the laser beams L0, entered via the light incidence plane 211, are guided, by the lateral face 213, toward the light irradiation plane 212 whose cross sectional area is smaller than that of the light incidence plane 211. That is, the laser beams L0 are converged onto the light irradiation plane 212.

Note that the elliptic truncated conic light converging section 21 of the present embodiment is made of quartz ($SiO_2$; refractive index of 1.45). Alternatively, the elliptic truncated conic light converging section 21 can be made of a transparent material such as BK7 or an acrylic resin.

The lateral face 213 is coated with a fluorine resin (polytetrafluoroethylene) having a refractive index of 1.35.

The elliptic truncated conic light converging section 21 achieves approximately 90% of light coupling efficiency with respect to the LD chip 101.

Note that the present embodiment discusses a case where each of the light incidence plane 211 and the light irradiation plane 212 is a flat plane. The present embodiment, however, is not limited to this. Alternatively, each of the light incidence plane 211 and the light irradiation plane 212 does not need to be the flat plane as later described.

For example, each of the light incidence plane 211 and the light irradiation plane 212 can have a convex-lens-like curved surface or a concave-lens-like curved surface so as to change angles of incident light and exit light. Alternatively, each of the light incidence plane 211 and the light irradiation plane 212 can have a compound-lens-like curved surface such as a curved surface obtained by combining a convex-lens-like curved surface and a concave-lens-like curved surface.

A lenticular curved surface, which serves as the light incidence plane 211 or the light irradiation plane 212, can have an aspherical shape, as well as a spherical surface.

Further, in a case where (i) a lens is provided between the light incidence plane 211 and the LD chip 101 and (ii) a lens is provided between the light irradiation plane 212 and the cylindrical light emitting element 40 as described later, the lenses can have an spherical shape or an aspherical shape such as a cylindrical shape.

According to the present embodiment, an outer face (lateral face 213 of elliptic truncated cone) of the elliptic truncated conic light converging section 21 is coated with the fluorine resin. The present embodiment is not limited to this. The outer face can be exposed to air. In such a case, it is preferable that the elliptic truncated conic light converging section 21 is held by a holding member (not illustrated) having a plurality of projections each of which is in point contact with the outer face of the elliptic truncated conic light converging section 21.

With the simple configuration, it is possible to ensure a difference of refractive indexes (a refractive index on the outer face side>a refractive index of the air) between the air and the outer face of the elliptic truncated conic light converging section 21. This allows incident light, which travels from the outer face side toward the air at a predetermined incident angle, to be subjected to a total reflection.

Moreover, it is possible to reduce a contact area between the holding member and the outer face of the elliptic truncated conic light converging section 21. As such, it is possible to reduce areas of regions (a plurality of regions) in which the differences of refractive indexes between the air and the outer face of the elliptic truncated conic light converging section 21 become uneven because of the point contacts.

The cylindrical light emitting element 40 of the present embodiment has a discoid (cylindrical) shape with a diameter of 2 mm and a thickness of 1 mm.

The cylindrical light emitting element 40 has a configuration identical to that already described.

It is preferable that a sialon fluorescent substance (oxynitride fluorescent substance) or a III-V compound semiconductor nanoparticle fluorescent substance is employed as the fluorescent substance. Instead, a yttrium(Y)-aluminum(Al)-garnet(G) fluorescent substance which is activated by cerium (Ce) (YAG:Ce) can be employed as the fluorescent substance.

Note that the cylindrical light emitting element 40 can be configured by dispersing a single type or plural types of fluorescent substance(s) in an appropriate dispersion medium. It is preferable that the dispersion medium is a solid. However, in a case such as a case where the fluorescent substance is sealed in a light-transmitting cylindrical container, the dispersion medium can be a liquid.

It is preferable that a light-transmitting resin material such as a silicone resin is employed as the dispersion medium. The silicone resin and the fluorescent substance are mixed at a weight ratio of approximately 10:1. Note that the dispersion medium is not limited to the silicone resin but can be (i) a glass material such as an inorganic glass material or (ii) an organic-inorganic hybrid material.

According to the light emitting device 120A of the present embodiment, the light incidence plane 211 of the elliptic truncated conic light converging section 21 is in contact with (or serves as) a light irradiation area of the cylindrical light emitting element 40 (see FIG. 3).

In a case where the light irradiation plane 212 of the elliptic truncated conic light converging section 21 has a flat cross-sectional shape, an irradiation range, in which the light irradiation plane 212 or the vicinity of the light irradiation plane 212 is irradiated with the laser beams L0, tends to become larger than the light irradiation plane 212 of the elliptic truncated conic light converging section 21.

In view of the circumstances, the light irradiation plane 212 of the present embodiment is in contact with the light irradiation area of the cylindrical light emitting element 40. As such, the light irradiation area of the cylindrical light emitting element 40 is irradiated with the laser beams L0 before the irradiation range of the laser beams L0 becomes larger than the light irradiation area.

Therefore, it is possible to prevent the irradiation range of the laser beams L0 from becoming larger than the size of the cylindrical light emitting element 40.

Note that the case where "the light irradiation plane 212 is in contact with the light irradiation area" encompasses (i) a case where the light irradiation plane 212 and the light irradiation area are joined and (ii) a case where the light irradiation plane 212 is in contact with the light irradiation area (or the cylindrical light emitting element 40). To "join" encompasses (i) joining by a method such as adhesion or welding and (ii) compression bonding.

Moreover, a light-transmitting member or a heat-radiating member which has a refractive index different from that of air can be provided (i) between the LD chip 101 and the light incidence plane 211 and/or (ii) between the light irradiation plane 212 and the cylindrical light emitting element 40.

The case, in which a light-transmitting member having a refractive index different from the air is provided, encompasses a case where the LD chip 101, a collimating lens which collimates a laser beam L0 generated by the LD chip 101, and a bundle fiber are connected with each other in this order so that the laser beam L0 emitted via a light emission edge of the bundle fiber enters via the light incidence plane 211.

This makes it possible to increase the number of LD chips 101 without enlarging a size of the light incidence plane 211.

Alternatively, the case, in which a light-transmitting member having a refractive index different from the air is provided, encompasses a case where a concave lens, a convex lens, or a GRIN lens (gradient index lens) is provided between the light irradiation plane 212 and the cylindrical light emitting element 40.

Note that the GRIN lens is a lens which does not have a convex or concave shape but functions as a lens because it has a refractive index gradient.

Accordingly, for example, it is possible to achieve a function of a lens with the use of the GRIN lens while the light irradiation plane 212 having a flat surface, i.e., while having neither a concave surface nor a convex surface.

Moreover, in a case where the other end of the elliptic truncated conic light converging section 21 is configured by the GRIN lens, the cylindrical light emitting element 40 and an end face of the GRIN lens (light irradiation plane 212) can be joined with no space therebetween. This is because the GRIN lens can achieve a lens function while having a flat surface.

This makes it possible to reduce an amount of the laser beams L0 which do not reach the light irradiation area. Accordingly, a luminous efficiency of the cylindrical light emitting element 40 can be further improved.

It is preferable that the heat-radiating member is provided, in particular, between the light irradiation plane 212 and the cylindrical light emitting element 40.

This makes it possible to prevent the cylindrical light emitting element 40 from being deteriorated by heat which is generated by the cylindrical light emitting element 40.

According to the configuration, even in a case where the cylindrical light emitting element 40 (or the light irradiation area) is small in size, it is possible to reduce the irradiation range in which the light irradiation plane 212 or the vicinity of the light irradiation plane 212 is irradiated with the laser beams L0, by a reduction in cross-sectional area of the light irradiation plane 212 of the elliptic truncated conic light converging section 21. This is because such a reduction can prevent the irradiation range of the laser beams L0 from becoming larger than the size of the cylindrical light emitting element 40.

According to a later described result of an experiment, a luminous flux of incoherent light L1 emitted from the cylindrical light emitting element 40 is, by a simple calculation, approximately 150 lm (lumen) per single laser light source of 1 W.

It follows that a luminous flux of incoherent light L1 per single light emitting point 102 (0.5 W) is approximately 75 lm.

As described early, the light coupling efficiency of the elliptic truncated conic light converging section 21 with respect to the LD chip 101 is approximately 90%. A luminous flux of the incoherent light L1 per single light emitting point 102 can be therefore estimated as approximately 75×0.9=67.5 lm.

It follows that, since the total number of the light emitting points 102 provided in the three LD chips 101 is 6×3=18, a total luminous flux of the incoherent light L1 emitted from the cylindrical light emitting element 40 becomes approximately 1215 (=67.5×18) lm. 1215 lm (i) is approximately three times larger than a luminous flux of 400 lm of a high-power white LED described later and (ii) is at the same level as a halogen lamp which achieves a luminous flux of 700 lm to 1500 lm.

It is difficult to accurately calculate an actual light intensity (a luminous flux per unit solid angle) because light is not emitted in an isotropic manner. Note, however, that a light intensity will be approximately 96.7 (cd) ($\approx$1215 (lm)/$4\pi \approx$1215/4/3.14 (cd)), on the assumption that the light is emitted in an isotropic manner from the light emitting point.

It follows that, in a case where an effective aperture area is approximately 3.14 mm$^2$ and an optical transmittance is approximately 0.7, a luminance is approximately 44 (Mcd/m$^2$) ($\approx$96.7 (cd)/0.7/3.14 (mm$^2$)=43.9 (cd/mm$^2$)).

44 (Mcd/m$^2$) is approximately 2.2 times larger than a later described luminance of 20 (Mcd/m$^2$) of the high-power white LED.

By thus reducing the area of the light irradiation plane 212 and a size of the cylindrical light emitting element 40, it is possible to reduce the size of the cylindrical light emitting element 40, which emits light having a high light luminance and a high luminous flux, regardless of the number of LD chips 101 which constitute the laser diode group 10.

[4. Concrete Example of Light Emitting Device (Part 2)]

Figure 4:
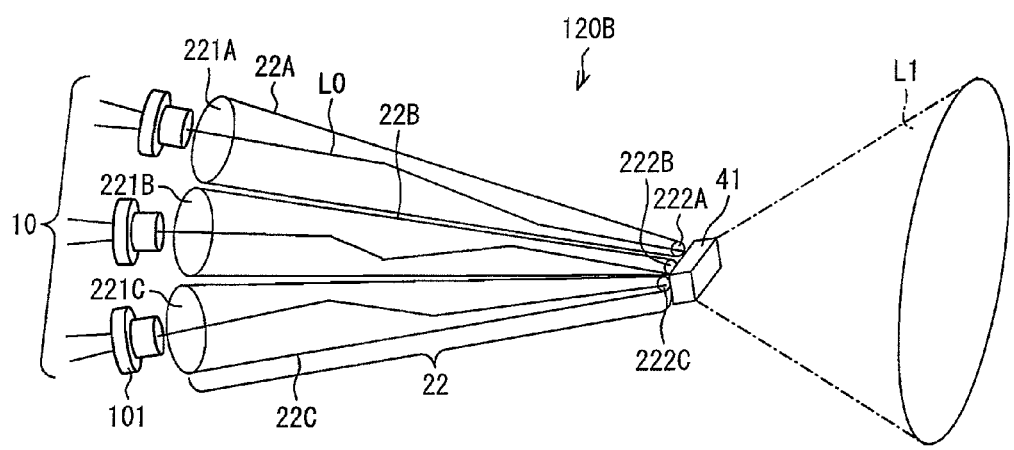
FIG. 4 is a schematic view illustrating yet another embodiment of the light emitting device.

The following describes a brief configuration of a light emitting device 120B in a further embodiment of the present invention, with reference to FIG. 4.

FIG. 4 illustrates a configuration of the light emitting device 120B which includes three circular truncated conic light converging sections (light guide irradiation members) 22A through 22C, having a tapered cylindrical shape, which is an example of the light guide irradiation section 20 of the light emitting device 110.

Note that the present embodiment employs three circular truncated conic light converging sections 22A through 22C. However, the number of the light guide irradiation members is not limited to three, i.e., the number can be two or more.

Note that the present embodiment describes the circular truncated conic light converging sections 22A through 22C as an example. However, a shape of each of the light guide irradiation members is not limited to this, but can be various shapes such as an elliptic truncated cone shape or a truncated pyramid shape.

The light emitting device 120B emits incoherent light L1. The light emitting device 120B includes a laser diode group 10, the circular truncated conic light converging sections 22A through 22C, and a rectangular parallelepiped light emitting element (light emitting section) 41 (see FIG. 4).

The laser diode group 10 has a configuration identical to the foregoing one.

The circular truncated conic light converging sections 22A through 22C have respective tapered cylindrical shapes and respective surrounded structures in which the circular truncated conic light converging sections 22A through 22C are configured to be respectively surrounded by lateral faces 223A through 223C (light reflective lateral faces, surrounded structures) of circular truncated cones which lateral faces reflect laser beams L0 which entered respective light incidence planes (one ends) 221A through 221C.

Each of the circular truncated conic light converging sections 22A through 22C has (i) a core section made of acryl and (ii) a clad section made of fluorine resin. The core section and the clad section are adhered to each other so that each of the circular truncated conic light converging sections 22A through 22C has wholly a tubular shape.

Each of the light incidence planes 221A through 221C has a circular shape with a diameter of approximately 7 mm. On the other hand, each of light emission planes (the other ends) 222A through 222C also has a circular shape with a diameter of approximately 1 mm.

The light emission planes 222A through 222C thus have respective cross-sectional areas which are smaller than those of the respective light incidence planes 221A through 221C. The laser beams L0 which entered the light incidence planes 221A through 221C are guided toward the light emission planes 222A through 222C by the lateral faces 223A through 223C of circular truncated cones.

The lateral faces 223A through 223C of circular truncated cones are provided so as to enclose (surround) respective light paths of the laser beams L0 emitted from the respective LD chips 101.

The "surrounded structure" can be exemplified by (i) a lateral face of a truncated cone such as a lateral face of an elliptic truncated cone or a lateral face of a truncated pyramid and (ii) the lateral face of the circular truncated cone of the present embodiment.

The laser beams L0 can be guided to the respective light emission planes 222A through 222C along light paths so that (i) the laser beams L0 are reflected from the respective lateral faces 223A through 223C only once, (ii) the laser beams L0 are reflected from the respective lateral faces 223A through 223C more than once, or (iii) the laser beams L0 are never reflected from the lateral faces 223A through 223C.

With the configuration, the laser beams L0, entered through the respective light incidence planes 221A through 221C are guided toward the respective light emission planes 222A through 222C whose cross sectional areas are smaller than those of the respective light incidence planes 221A through 221C. That is, the laser beams L0 can be converged onto the respective light emission planes 222A through 222C.

According to the configuration, by causing the light emission planes 222A through 222C of the respective circular truncated conic light converging sections 22A through 22C to be put together, it is possible to direct the laser beams L0, generated by the plurality of LD chips 101, toward a light irradiation area of a single rectangular parallelepiped light emitting element 41, even in a case where the plurality of LD chips 101 are away from each other.

Moreover, the circular truncated conic light converging sections 22A through 22C have identical lengths of their longer sides, so that the light incidence planes 221A through 221C of the respective circular truncated conic light converging sections 22A through 22C can be equidistant from the vicinity of a center of the light irradiation area of the rectangular parallelepiped light emitting element 41 (see FIG. 4).

Accordingly, for example, it is possible to substantially maximize a utilization efficiency (coupling efficiency=emitted light from the other end/incident light on the one end) of a laser beam L0 generated by each of a plurality of LD chips 101, in a case where (i) the plurality of LD chips 101 are provided so as to be equidistant from the center of the light irradiation area and (ii) the light emitting points 102 of the respective of the plurality of LD chips 101 are provided so as to face the center of the light irradiation area.

In this case, it is also possible for the laser beams L0 generated by the plurality of LD chips 101 to have substantially identical optical distances. Accordingly, for example, in a case where excitation light is coherent light like the laser beams L0, it is possible to further enhance intensity of the laser beams L0 by causing the laser beams L0 to have identical phases.

Each of the circular truncated conic light converging sections 22A through 22C achieves approximately 90% of light coupling efficiency with respect to the LD chip 101.

In a case where the rectangular parallelepiped light emitting element 41 is employed in a vehicle head lamp, the rectangular parallelepiped light emitting element 41 can have a horizontally long rectangular parallelepiped shape with an approximate size of width×depth×height=3 mm×1 mm×1 mm. Note that constituent materials, etc. of the rectangular parallelepiped light emitting element 41 are identical to those of the foregoing cylindrical light emitting element 40.

Moreover, light-transmitting members or heat-radiating members each of which has a refractive index different from that of air can be respectively provided (i) between the LD chips 101 and corresponding ones of the light incidence planes 221A through 221C and/or (ii) between the respective light emission planes 222A through 222C and the rectangular parallelepiped light emitting element 41.

For example, optical fibers or bundle fibers, via which the LD chips 101 and the respective light incidence planes 221A through 221C are connected, can be employed as the light-transmitting members having a refractive index different from that of air.

It is preferable to provide a heat-radiating member, in particular, between the rectangular parallelepiped light emitting element 41 and the respective light emission planes 222A through 222C.

This makes it possible to prevent the rectangular parallelepiped light emitting element 41 from being deteriorated by heat generated from the rectangular parallelepiped light emitting element 41.

According to the configuration, even in a case where the rectangular parallelepiped light emitting element 41 (or the light irradiation area) is small in size, it is possible to reduce the respective irradiation ranges in which the light emission planes 222A through 222C or the vicinities of the light emission planes 222A through 222C are irradiated with the respective laser beams L0, by a reduction in respective cross-sectional areas of the light emission planes 222A through 222C of the respective circular truncated conic light converging sections 22A through 22C. This is because such a reduction can prevent the irradiation range of the laser beams L0 from becoming larger than the size of the rectangular parallelepiped light emitting element 41.

Note that the light emitting device 120B of the present embodiment is configured so that the light emission planes 222A through 222C are provided side by side in a horizontal direction. This is because the rectangular parallelepiped light emitting element 41 has a horizontally long rectangular parallelepiped shape.

By adjusting the number of and/or the locations of circular truncated conic light converging sections 22A through 22C, it is thus possible to irradiate the light irradiation area with the laser beams L0 emitted from the light emission planes 222A through 222C in accordance with a shape of the light irradiation area of the light emitting section.

According to the later described result of the experiment, by a simple calculation, the luminous flux of the incoherent light L1 emitted from the rectangular parallelepiped light emitting element 41 is approximately 150 lm (lumen) per single laser light source of 1 W.

It follows that a luminous flux of incoherent light L1 becomes approximately 75 lm per light emitting point 102 (0.5 W).

As described early, the light coupling efficiency of each of the circular truncated conic light converging sections 22A through 22C with respect to the LD chip 101 is approximately 90%. A luminous flux of the incoherent light L1 per light emitting point 102 can be therefore estimated as approximately 75×0.9=67.5 lm.

It follows that, since the total number of the light emitting points 102 provided in the three LD chips 101 is 6×3=18, a total luminous flux of the incoherent light L1 emitted by the rectangular parallelepiped light emitting element 41 becomes approximately 1215 (=67.5×18) lm. 1215 lm (i) is approximately three times larger than a luminous flux of 400 lm of a high-power white LED described later and (ii) is at the same level as a halogen lamp which achieves a luminous flux of 700 lm to 1500 lm.

It is difficult to accurately calculate an actual light intensity (a luminous flux per unit solid angle) because light is not emitted in an isotropic manner. Note, however, that a light intensity will be approximately 96.7 (cd) 1215 (ml)/$4\pi \approx 1215/4/3.14$ (cd)), on the assumption that the light is emitted in an isotropic manner from the light emitting point. It follows that, in a case where an effective aperture area is approximately 3 mm$^2$ and an optical transmittance is approximately 0.7, a luminance is approximately 46 (Mcd/m$^2$) ($\approx$96.7 (cd)/0.7/3 (mm$^2$)).

46 (Mcd/m$^2$) is approximately 1.8 times larger than a later described luminance of 25 (Mcd/m$^2$) of the high-power white LED.

By thus reducing the areas of the respective light emission planes 222A through 222C and a size of the rectangular parallelepiped light emitting element 41, it is possible to reduce the size of the rectangular parallelepiped light emitting element 41, which emits light having a high luminance and a high luminous flux, regardless of the number of LD chips 101 which constitute the laser diode group 10.

[5. Preferable Mode of Light Guide Irradiation Member]

The following describes configurations of an equidistant arrangement light converging section (light guide irradiation member) 23 and a turtleneck-shaped light converging section (light guide irradiation member) 24 which are examples of a preferable mode of the light guide irradiation member of the present invention, with reference to FIGS. 5(a) and 5(b).

FIG. 5(a) is a cross-sectional view of the equidistant arrangement light converging section 23 which cross-sectional view is obtained when viewed in a vertical direction from immediately above. Namely, FIG. 5(a) is a cross-sectional view obtained when the equidistant arrangement light converging section 23 is horizontally cut.

The equidistant arrangement light converging section 23 has a light irradiation plane (the other end) 232 which is in contact with (or bonded to) the light irradiation area of the cylindrical light emitting element 40.

The equidistant arrangement light converging section 23 has a configuration substantially identical to that of the foregoing elliptic truncated conic light converging section 21, except that the light incidence plane 211 of the elliptic truncated conic light converging section 21 is replaced with a light incidence curved surface (one end) 231.

According to the configuration, the light incidence curved surface 231 of the equidistant arrangement light converging section 23 has a cross-sectional shape, whose cutting-plane line is a circular arc C which is at equal distances from a center O of the light irradiation area of the cylindrical light emitting element 40. Note that the cutting-plane line is obtained when the equidistant arrangement light converging section 23 is horizontally cut.

In other words, the light incidence curved surface 231 has a cross-sectional shape obtained by bending the light incidence plane 211, having an elliptical flat surface, so that the light incidence plane 211 is along the circular arc C.

Note that the lateral face (light reflective lateral face constituting the surrounded structure) 233 of the elliptic truncated cone is provided so as to enclose all light paths of the respective laser beams L0 emitted from the plurality of LD chips 101.

Accordingly, for example, it is possible to substantially maximize a utilization efficiency (coupling efficiency=emitted light from the other end/incident light on the one end) of a laser beam L0 generated by each of a plurality of LD chips 101, in a case where (i) the plurality of LD chips 101 are provided so as to be equidistant from the center O of the light irradiation area, and (ii) the light emitting points 102 of the respective of the plurality of LD chips 101 are provided so as to face the center O of the light irradiation area.

In this case, it is also possible for the laser beams L0 generated by the plurality of LD chips 101 to have substantially identical optical distances. Accordingly, for example, in a case where excitation light is coherent light like the laser beams L0, it is possible to further enhance intensity of the laser beams L0 by causing the laser beams L0 to have identical phases.

The light incidence plane which is the one end of the light guide irradiation member can have, for example, a cross-sectional shape, whose cutting-plane line is a polygonal curve (not illustrated) made up of a plurality of lines which are at equal distances from the center O of the light irradiation area of the cylindrical light emitting element 40. Note that the cutting-plane line is obtained when the one end of the light guide irradiation member is horizontally cut.

FIG. 5(b) is a cross-sectional view of the turtleneck-shaped light converging section (light guide irradiation member) 24 when viewed in a vertical direction from immediately above. Namely, FIG. 5(b) is a cross-sectional view obtained when the turtleneck-shaped light converging section 24 is horizontally cut.

Note that the feature of the turtleneck-shaped light converging section 24 resides in a configuration in the vicinity of a light irradiation plane (the other end) 242. Therefore, a configuration of light incidence plane side of the turtleneck-shaped light converging section 24 is omitted here and the configuration on the light incidence plane side is not illustrated.

The constricted lateral face (light reflective lateral face constituting the surrounded structure) 243 is provided so as to enclose all light paths of the respective laser beams L0 emitted from the LD chips 101.

Figure 5:
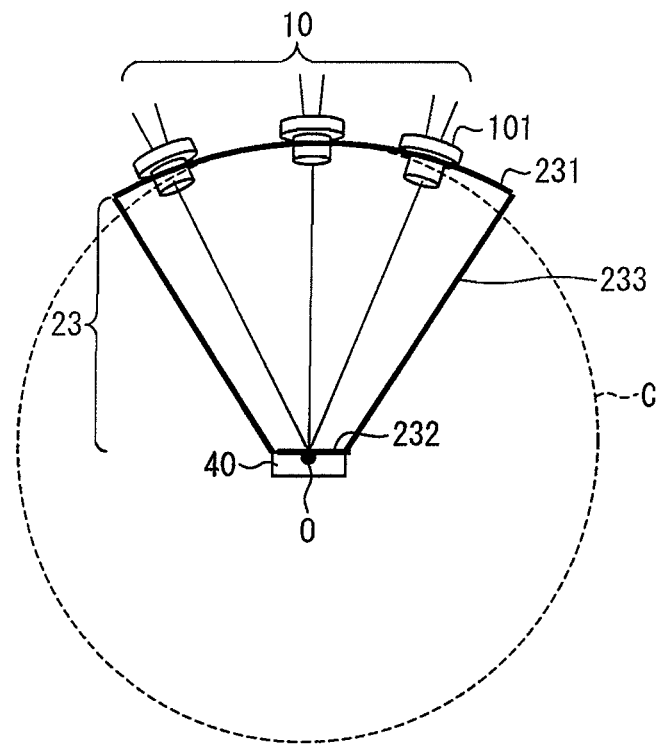
FIG. 5(a) is a schematic view illustrating an example of a preferable embodiment of a light guide irradiation member in relation to the light emitting device.
FIG. 5(b) is a schematic view illustrating another example of a preferable embodiment of the light guide irradiation member.
Figure 5:
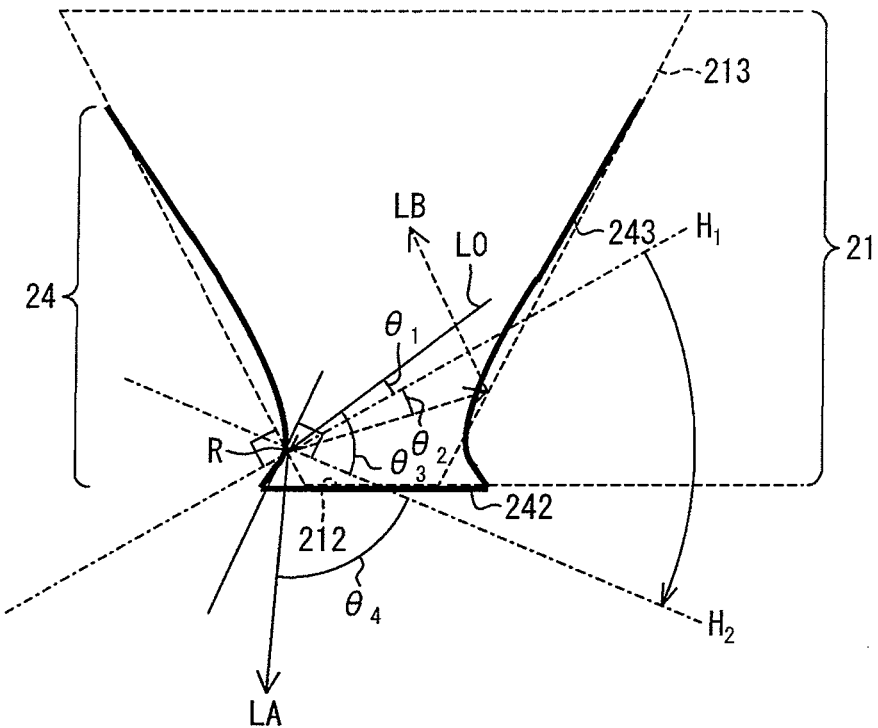

The turtleneck-shaped light converging section 24 has a configuration which is substantially identical to that of the elliptic truncated conic light converging section 21 (drawn by dotted lines in FIG. 5(*b*)), except that the configuration in the vicinity of the light irradiation plane 242 is slightly different.

Specifically, the constricted lateral face 243 of the turtleneck-shaped light converging section 24 is projected inward in the vicinity of the light irradiation plane 242.

In a case where the elliptic truncated conic light converging section 21 has the lateral face 213 whose generating lines are straight lines as illustrated by the dotted lines in FIG. 5(*b*), since a laser beam L0 is reflected from the lateral face 213 several times, an incident angle $\theta_1$ at which the laser beam L0 enters a point R in the vicinity of the light irradiation plane 212 becomes small.

The laser beam L0, which entered the point R, is reflected at a reflection angle $\theta_2$ so as to be directed in a direction in which a laser beam LB propagates, and therefore will never reach the light irradiation area of the light emitting section.

On the other hand, the turtleneck-shaped light converging section 24 shown in FIG. 5(*b*) has the constricted lateral face 243 which is projected inward in the vicinity of the light irradiation plane 242. This causes an incident angle $\theta_3$, at which a laser beam L0 enters the point R of the constricted lateral face 243, to be larger than the incident angle $\theta_1$. As such, the laser beam L0 can be reflected at a reflection angle $\theta_4$, and is then directed in a direction in which a laser beam LA propagates.

This makes it possible to prevent the laser beam L0 which enters the point R from not reaching the light irradiation area. As such, it is possible to further improve a luminous efficiency of the light emitting section.

[6. Method for Selecting Shape of the Other End of Light Guide Irradiation Member]

Figure 6:
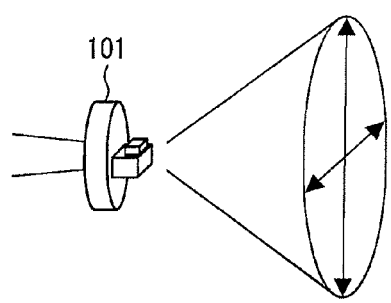
FIG. 6(a) is a view illustrating a light emitting tendency of the LD.
FIG. 6(b) is a perspective view illustrating an example of a light emitting section of the light emitting device.
FIG. 6(c) is a view illustrating an example of emitted light in a case where no convex-lens-like curved surface is provided on a second edge of a light guide irradiation member.
FIG. 6(d) is a view illustrating an example of emitted light in a case where a convex-lens-like curved surface is provided on the other end.
FIG. 6(e) is a view illustrating an example of emitted light in a case where no concave-lens-like curved surface is provided on a second edge of a light guide irradiation member.
FIG. 6(f) is a view illustrating another example of emitted light in a case where a concave-lens-like curved surface is provided on the other end.
Figure 6:
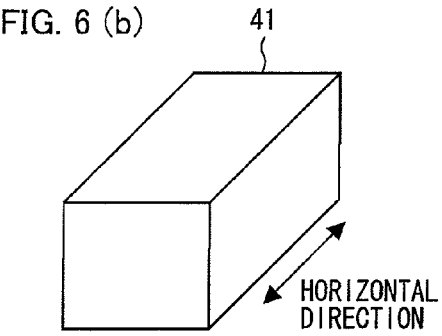
Figure 6:
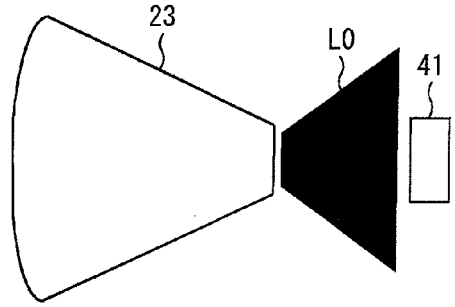
Figure 6:
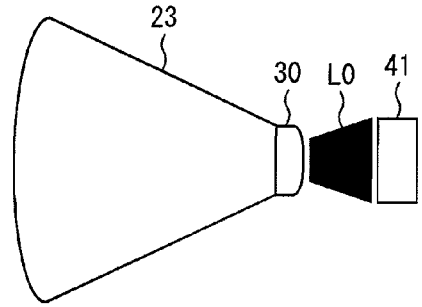
Figure 6:
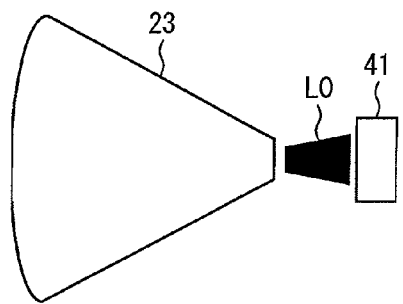
Figure 6:
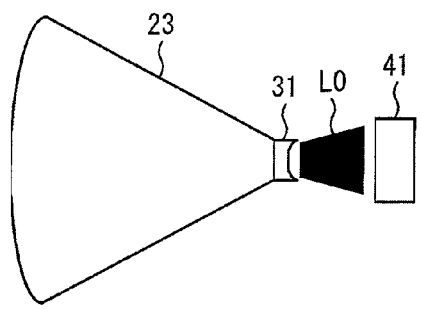

The following describes a method for selecting a shape of the other end of the light guide irradiation member, with reference to FIGS. 6(*a*) through 6(*f*).

In a case where the LD chip 101 (a small rectangular parallelepiped on a large rectangular parallelepiped provided on a leading end of the LD chip 101) is horizontally provided, the laser beams L0 emitted from the LD chip 101 tend to have an elliptic cone shape which is longitudinally (vertically) long and transversally (horizontally) short (see FIG. 6(*a*)).

It is assumed that (i) each of laser beams L0 emitted from the light emitting points 102 of the LD chip 101 has an aspect ratio which is drastically large (e.g., 5 degrees in the horizontal direction, 30 degrees in the vertical direction) and (ii) superposition of the laser beams L0 emitted by the light emitting points 102 tends to have an elliptic cone shape.

On the other hand, the rectangular parallelepiped light emitting element 41 has a rectangular parallelepiped shape which is vertically short and horizontally long (see FIG. 6(*b*)).

In view of the circumstances, it is necessary to provide an optical component for converting a laser beam L0, which has an elliptic cone shape which is longitudinally (vertically) long, into a laser beam L0 which has an elliptic cone shape which is vertically short and horizontally long so that a luminous efficiency of the rectangular parallelepiped light emitting element 41 is improved.

The following describes what is a light emitting tendency in a case where the equidistant arrangement light converging section 23 is employed.

FIG. 6(*c*) illustrates a pattern indicative of a light emitting tendency of light beams emitted from the equidistant arrangement light converging section 23 which does not have a convex-lens-like curved surface 30. The pattern illustrates a case where the light irradiation plane (the other end) 232 is comparatively horizontally wide so that the horizontal spreading of the laser beam L0 is larger than a horizontal width of the light irradiation area of the rectangular parallelepiped light emitting element 41. Such a case is suitably exemplified by the light irradiation plane 232 which has a horizontal width which is wider than the width of the light irradiation area.

Even in a case where the light irradiation plane 232 has a horizontal width which is shorter than the horizontal width of the light irradiation area, the horizontal spreading of the laser beams L0 may be larger than the horizontal width of the light irradiation area of the rectangular parallelepiped light emitting element 41, depending on a shape of the equidistant arrangement light converging section 23.

For example, in a case where the light irradiation plane 232 is flat, laser beams L0 emitted from the light irradiation plane 232 cannot be parallel beams in general, but spread in some degree.

Accordingly, in a case where a distance between the light irradiation plane 232 and the rectangular parallelepiped light emitting element 41 is long (i.e., the rectangular parallelepiped light emitting element 41 is disposed off from the light irradiation plane 232), the horizontal spreading of the laser beams L0 can be larger than the horizontal width of the light irradiation area, regardless of which is larger the horizontal width of the light irradiation plane 232 or the horizontal width of the light irradiation area of the rectangular parallelepiped light emitting element 41.

FIG. 6(*e*) illustrates a pattern indicative of a light emitting tendency of light beams emitted from the equidistant arrangement light converging section 23 which does not have a concave-lens-like curved surface 31. The pattern illustrates a case where the light irradiation plane 232 is comparatively horizontally short so that the horizontal spreading of the laser beam L0 is shorter than a horizontal width of the light irradiation area of the rectangular parallelepiped light emitting element 41.

Such a case is exemplified by the light irradiation plane 232 which has horizontal width which is drastically shorter than the horizontal width of the light irradiation area of the rectangular parallelepiped light emitting element 41.

The spreading of the laser beams L0 can be smaller than the horizontal width of the light irradiation area of the rectangular parallelepiped light emitting element 41, in a case where (i) the horizontal width of the light irradiation plane 232 is not drastically shorter than the horizontal width of the light irradiation area of the rectangular parallelepiped light emitting element 41 but the horizontal width of the light irradiation area of the rectangular parallelepiped light emitting element 41 is substantially identical to that of the light irradiation plane 232 and (ii) the laser beams L0 emitted from the light irradiation plane 232 become substantially parallel beams by adjusting an optical design of the equidistant arrangement light converging section 23.

The convex-lens-like curved surface 30 shown in FIG. 6(*d*) is a convex-lens-like curved surface having (i) an axis extending in a vertical direction (in a front-back direction of the sheet on which FIG. 6(*d*) is illustrated) and (ii) a convex part facing the light irradiation area. The convex-lens-like curved surface 30 is an optical component having a function of making smaller the horizontal spreading of the laser beams L0 than the horizontal width of the light irradiation area of the rectangular parallelepiped light emitting element 41.

In a case where the spreading of the laser beam L0 is larger than the horizontal width of the light irradiation area of the rectangular parallelepiped light emitting element 41 (see FIG. 6(c)), the convex-lens-like curved surface 30 can be provided, as the light irradiation plane 232, between the equidistant arrangement light converging section 23 and the rectangular parallelepiped light emitting element 41.

Note that it is possible to provide the foregoing GRIN lens, which has a function of a convex lens, on the other end of the equidistant arrangement light converging section 23, instead of the convex-lens-like curved surface 30.

On the other hand, the concave-lens-like curved surface 31 shown in FIG. 6(f) is a concave-lens-like curved surface having (i) an axis extending in the vertical direction and (ii) a concave part facing the light irradiation area. The concave-lens-like curved surface 31 is an optical component having a function of making larger the horizontal spreading of the laser beams L0 than the horizontal width of the light irradiation area of the rectangular parallelepiped light emitting element 41.

In a case where the spreading of the laser beam L0 is smaller than the horizontal width of the light irradiation area of the rectangular parallelepiped light emitting element 41 (see FIG. 6(e)), the concave-lens-like curved surface 31 can be provided, as the light irradiation plane 232, between the equidistant arrangement light converging section 23 and the rectangular parallelepiped light emitting element 41.

Note that it is possible to provide the foregoing GRIN lens, which has a function of a concave lens, on the other end of the equidistant arrangement light converging section 23, instead of the concave-lens-like curved surface 31.

In stead of the convex-lens-like curved surface 30 or the concave-lens-like curved surface 31, it is possible to employ a curved surface, in accordance with a shape of an irradiation area of the light emitting section, such as a compound-lens-like curved surface prepared by combining (i) a lens-like curved surface having a concave surface and an arbitrary axis and (ii) a lens-like curved surface having a convex surface and an arbitrary axis; a compound-lens-like curved surface prepared by combining (i) a lens-like curved surface having a convex surface and an arbitrary axis and (ii) a lens-like curved surface having a convex surface and an arbitrary axis; or a compound-lens-like curved surface prepared by combining (i) a lens-like curved surface having a concave surface and an arbitrary axis and (ii) a lens-like curved surface having a concave surface and an arbitrary axis.

A luminous efficiency of the light emitting section can be improved by employing an appropriate compound-lens-like curved surface in accordance with a shape of the light irradiation area of the light emitting section.

[7. Concrete Example of Illuminating Device (Vehicle Headlight)]

Figure 7:
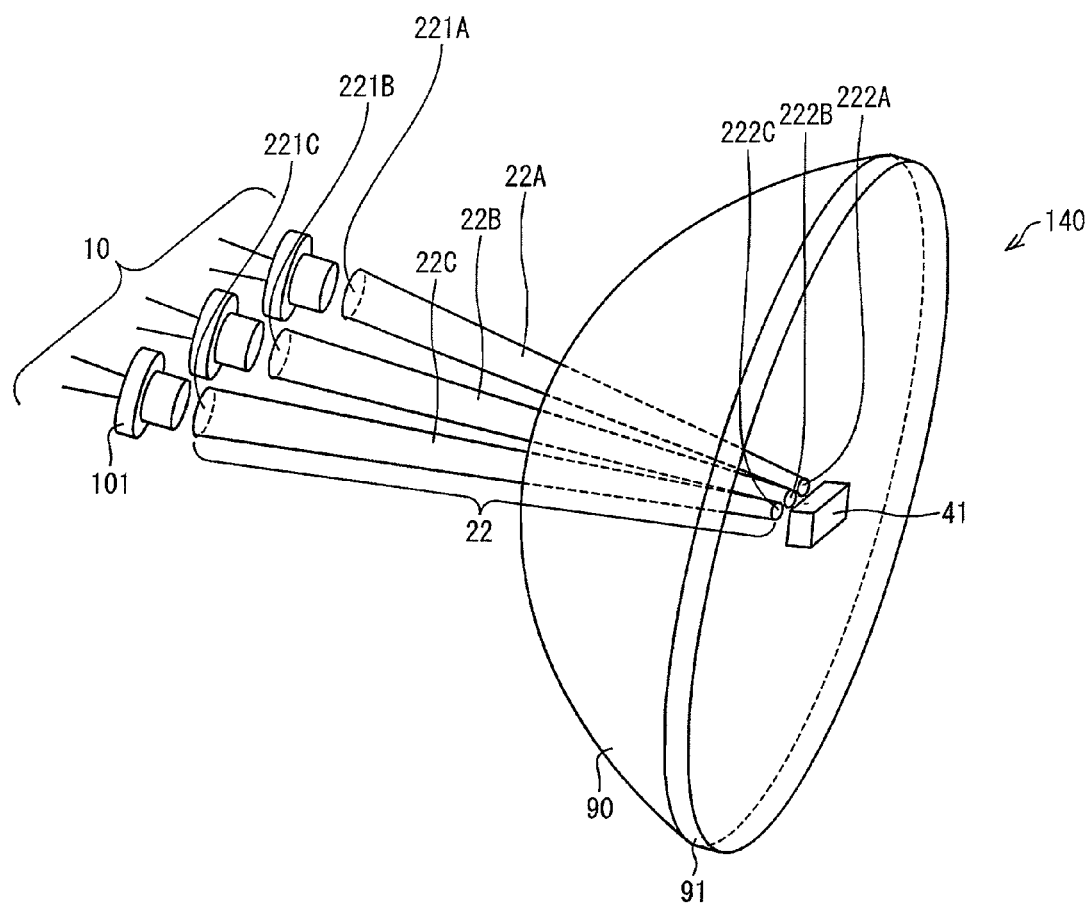
FIG. 7 is a schematic view illustrating a brief configuration of an illuminating device in an embodiment of the present invention.

The following describes an illuminating device 140 which is an embodiment of the present invention, with reference to FIG. 7.

The illuminating device 140 has a configuration substantially identical to that of the light emitting device 120B shown in FIG. 4, except for a reflecting mirror 90 and a transparent plate 91. Therefore, description of the configuration other than the reflecting mirror 90 and the transparent plate 91 is omitted here.

The reflecting mirror 90 reflects incoherent light L1 (hereinafter, simply referred to as "light") emitted from the rectangular parallelepiped light emitting element 41 so as to form a bundle of light rays which travel in a predetermined solid angle. That is, the reflecting mirror 90 reflects the light emitted from the rectangular parallelepiped light emitting element 41 so as to form a bundle of light rays which travel frontward from the illuminating device 140. The reflecting mirror 90 is a member which has a curved surface shape (cup-like shape) and which is coated with a metal thin film. The reflecting mirror 90 has an opening in a traveling direction in which the light reflected from the reflecting mirror 90 is directed.

According to the present embodiment, the reflecting mirror 90 has a hemispherical shape whose center corresponds to a focal position. Further, an opening part of the reflecting mirror 90 has (i) a flat surface perpendicular to the traveling direction of the light reflected from the reflecting mirror 90 (i.e., a flat surface of the reflecting mirror 90 perpendicular to the traveling direction of the light emitted outside from the illuminating device 140) and (ii) a cross-section of the opening part including the center of the reflecting mirror 90.

The cross-section of the opening part has an area which is smaller than 2000 mm$^2$ (a diameter (optical diameter) of the cross-section of the opening part is smaller than 50 mm). That is, a size of the reflecting mirror 90 is smaller than 2000 mm$^2$ when the reflecting mirror 90 is viewed from a direction (i.e., from right in front of a vehicle) in which the light reflected from the reflecting mirror 90 travels. Note that the area of the cross-section of the opening part is smaller than 2000 mm$^2$ in this embodiment. However, it is more preferable that the area is smaller than 1500 mm$^2$ (the diameter is smaller than 43.7 mm).

For example, in a case where a conventional halogen lamp is used as a head lamp for a high beam, the following problem occurs. Namely, it is sometimes impossible to emit the light which has a luminous range that a high beam should satisfy when an area of a cross-section of an opening part of the conventional halogen lamp is smaller than 2000 mm$^2$.

On the other hand, according to the illuminating device 140, it is possible to cause a luminance of the rectangular parallelepiped light emitting element 41 to be larger than 25 cd/mm$^2$ which is a maximum luminance which the halogen lamp can achieve, as described later. Therefore, it is possible to emit the light which has the luminous range that the high beam should satisfy, even though the area of the cross-section of the opening part is smaller than 2000 mm$^2$.

An HID lamp which achieves a luminance of approximately 75 cd/mm$^2$ is known as a high-intensity light source. However, the HID lamp has a problem of poor instantaneous lighting property, and therefore the HID lamp is not suitable for a head lamp for high beam use.

Therefore, in terms of usefulness, the illuminating device 140 can achieve an illuminating device for high beam use which is drastically smaller in size than the conventional illuminating devices.

Moreover, there can also cause a problem that, even in a case where an HID lamp is used as a head lamp for a high beam, it is sometimes impossible to emit the light which has the luminous range that a high beam should satisfy when an area of a cross-section of an opening part of the HID lamp is smaller than 1500 mm$^2$.

On the other hand, according to the illuminating device 140, it is possible to cause a luminance of the rectangular parallelepiped light emitting element 41 to be larger than 75 cd/mm$^2$ which is a practicable maximum luminance and which the HID lamp can achieve, as described later. Therefore, it is possible to emit the light which has the luminous range that the high beam should satisfy, even though the area of the cross-section of the opening part is smaller than 1500 mm$^2$.

The transparent plate 91 is a transparent resin plate (i) which covers the opening part of the reflecting mirror 90 and (ii) which holds the rectangular parallelepiped light emitting element 41. It is preferable that the transparent plate 91 is made of a material which (i) blocks the laser beams L0 emitted from the LD chip 101 and (ii) transmits white light (incoherent light L1) generated by causing the rectangular parallelepiped light emitting element 41 to convert the laser beam L0.

The coherent laser beams L0 are mostly converted into the incoherent light L1 by the rectangular parallelepiped light emitting element 41. However, a part of the laser beams L0 is not converted for some reason. Even in such a case, the transparent plate 91 blocks the laser beams L0 so that the laser beams L0 are not emitted outside. Note that it is possible to omit to provide the transparent plate 91 in a case where (i) the above described effect is not expected and (ii) the rectangular parallelepiped light emitting element 41 is held by a member other than the transparent plate 91.

[8. Light Distribution Characteristic of Light Emitting Device]

An experiment was carried out with the use of a light emitting device (hereinafter, referred to as an experimental device) which was experimentally prepared with the use of ten (10) LD chips 11 each of which is a laser diode (whose oscillation wavelength is 405 nm) with a single stripe per chip. Each of the LD chips 11 (i) has an optical power of 1.0 W and (ii) is driven at an operating voltage of 5 V and an operating current of 0.6 A.

According to the experimental device, the elliptic truncated conic light converging section 21 was use as a light guide irradiation member, and the cylindrical light emitting element 40 (with diameter of 2 mm and thickness of 1 mm) was used as a light emitting section.

A light coupling efficiency of each of the LD chips 11 and a corresponding one of the elliptic truncated conic light converging sections 21 is about 90%.

When the light distribution characteristic of the experimental device was measured, the cylindrical light emitting element 40 emitted light whose luminous flux is approximately 1350 lm.

Further, a luminance of the cylindrical light emitting element 40 was approximately 48.9 Mcd/m$^2$ (megacandela per square meter).

From the result of the experiment, it turned out that a light intensity (a luminous flux per unit solid angle) of each of the LD chips 11 was approximately 135 lm by a simple calculation, when assuming that the light is emitted in an isotropic manner from each of light emitting points. Accordingly, for example, in a case where 15 or more pieces of LD chips 11 are used, the cylindrical light emitting element 40 is capable of emitting light of approximately more than 2000 lm.

It is difficult to accurately calculate an actual light intensity (a luminous flux per unit solid angle) because light is not emitted in an isotropic manner. Note, however that, 20 LD chips 11 are to achieve a light intensity of approximately 214 (cd) 135×20 (lm)/4π≈2700 (lm)/4/3.14), by a simple calculation, on the assumption that the light is emitted in an isotropic manner from the light emitting point. In a case where (i) an effective aperture area is approximately 3.14 mm$^2$ and (ii) a transmittance of the optical system is approximately 0.7, a luminance is approximately 214 (cd)/0.7/3.14 (mm$^2$)≈97.3 (cd/mm$^2$)≈100 (Mcd/m$^2$).

Note that, as a result of similar experiments which were carried out while changing the number of the LD chips 11, it turned out that each of the cylindrical light emitting element 40 and the rectangular parallelepiped light emitting element 41 was able to achieve a high luminous flux of more than 2000 lm and a high luminance of more than 100 Mcd/m$^2$ (hereinafter, the light emitting device which can achieve such a high luminance and a high luminous flux is simply referred to as a "laser illuminating device").

[9. Comparison of Light Distribution Characteristic Between Light Emitting Device and Conventional Lamp]

Figure 8:
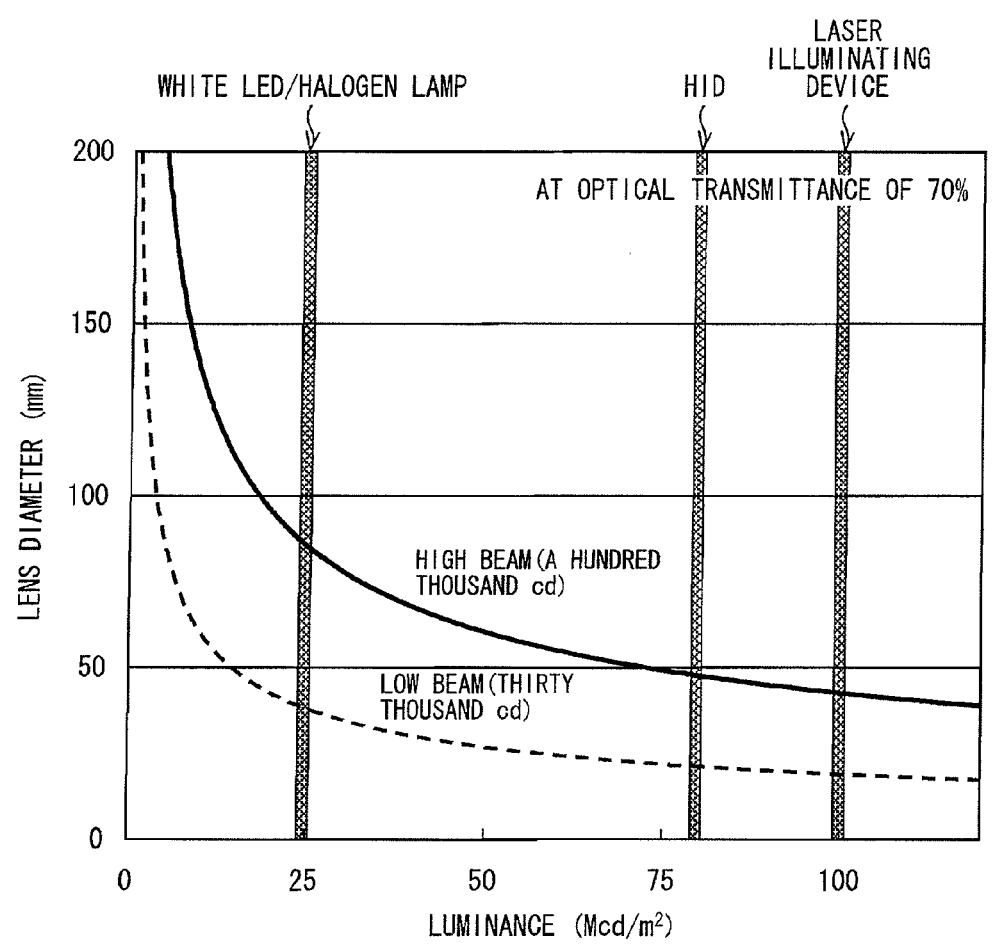
FIG. 8 is a graph illustrating comparisons between different types of lamps in terms of lens diameters required for a car head lamp.
Figure 10:
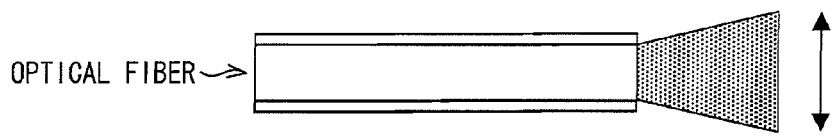
FIG. 10(a) is a view illustrating a light emitting tendency of a conventional optical fiber.
FIG. 10(b) is a view illustrating a light emitting tendency of a conventional bundle fiber.
FIG. 10(c) is a view illustrating a light emitting tendency in a case where a convex lens is provided on a light emission edge of the conventional bundle fiber.
Figure 10:
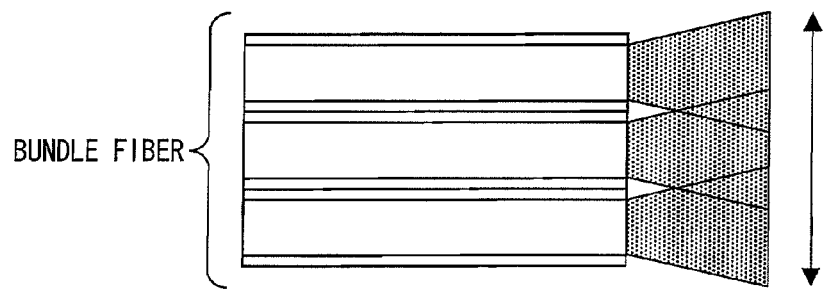
Figure 10:
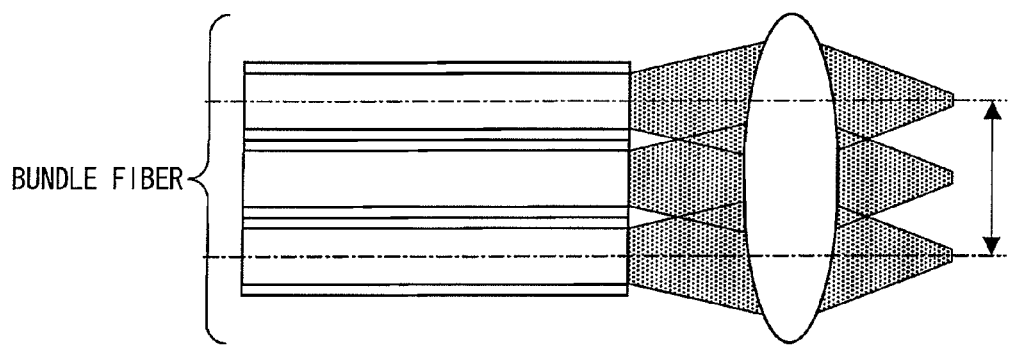

The following describes results of comparison of light distribution characteristics from the above described laser illuminating device and a conventional lamp, with reference to FIG. 8 through FIG. 9(c).

FIG. 8 is a graph illustrating comparison results as to how lens diameters required for a car head lamp change depending on types of lamps.

A commercially available halogen lamp achieves a luminance of approximately 25 Mcd/m$^2$, and the HID lamp achieves a luminance of approximately 80 Mcd/m$^2$ (see FIG. 8).

On the other hand, the laser illuminating device can achieve a high luminance of approximately 100 Mcd/m$^2$. Accordingly, it is possible to achieve a high luminance which (i) is approximately four times larger than that of the halogen lamp and (ii) is larger than that of the HID lamp (see FIG. 8).

In view of the comparison results, it is preferable that a luminance of incoherent light L1 emitted by the cylindrical light emitting element 40 (or the rectangular parallelepiped light emitting element 41) is 80 Mcd/m$^2$ or more.

In general, a halogen lamp is used as a head lamp for high beam use of a car. The laser illuminating device can achieve car head lamp with a high luminance which is approximately four times larger than that of the halogen lamp in a case where, for example, the foregoing cylindrical light emitting element 40 (or the rectangular parallelepiped light emitting element 41), which has an aperture area size smaller than that of the halogen lamp, is used as the head lamp for high beam use. Accordingly, it is possible to reduce, to one-quarter, an area of a lens provided in front of the head lamp for high beam use in a case where the laser illuminating device is used.

Note that a light-emitting filament of the halogen lamp has an approximate size of width×depth×height=5 mm×1.5 mm×1.5 mm.

FIG. 9(a) is a table illustrating comparison of performances from types of lamps. FIG. 9(b) is a view illustrating an example of an exterior of a conventional car head lamp. FIG. 9(c) is a view illustrating an example of an exterior of a car head lamp which is configured by the laser illuminating device.

The commercially available high-power white LED (hereinafter, referred to as "white LED") emits light with a luminous flux of at most approximately 400 lm per module. The luminous flux of an in-vehicle halogen lamp is approximately 700 lm to 1500 lm (the luminous flux of a halogen lamp for a standard-sized car is approximately 1000 lm in general). The luminous flux of an HID lamp is approximately 3200 lm (see FIG. 9(a)). Note, however, that it is difficult to utilize, as irradiation light of a headlight, the whole luminous flux of 3200 lm of the HID lamp due to the configuration and shape of the HID lamp. It is said that an effective luminous flux which can be utilized is merely 2000 lm or less. There is a further problem that the optical system of the HID lamp is difficult to design.

On the other hand, the present laser illuminating device can achieve a high luminous flux of more than 2000 lm. Specifically, it is possible to achieve a high luminous flux which is (i) approximately four to five times larger than that of the white LED, (ii) larger than that of the halogen lamp, and (iii) similar to that of the HID lamp (effectively, larger than the luminous flux of the HID lamp).

In view of the circumstances, it is preferable that the luminous flux of the incoherent light L1 emitted by the cylindrical light emitting element 40 is 1500 lm or more but 3200 lm or less.

In general, the white LED is used as a head lamp for low beam use of a car. According to the present laser illuminating device, one (1) LD chip can achieve, for example, a high luminous flux which is four to five times larger than that of one (1) white LED.

According to the present laser illuminating device, it is necessary to provide only one (1) head lamp for high beam use and one (1) head lamp for low beam use (see FIG. 9(*c*)), unlike the conventional head lamp whose size is shown in FIG. 9(*b*). Further, it is possible to drastically reduce an area of a lens to be provided in front of the head lamps for high beam use and low beam use.

The laser illuminating device has a life of approximately 10000 hours under continuous use, which is substantially identical to that of the white LED which has a long life (see FIG. 9(*a*)).

Accordingly, the present invention can provide devices such as the light emitting device 110, the light emitting device 120A, the light emitting device 120B, and the illuminating device 140 which can achieve a high luminance, a high luminous flux, and a long life.

Note that the present invention can be expressed as follows.

A high-intensity light source (light emitting device) of the present invention is made up of three main parts.

(1) A solid-state light source which serves as an excitation light source.

(2) A light emitting section which contains a fluorescent substance.

(3) A light guide member which guides excitation light emitted by the excitation light source toward the light emitting section.

Specifically, the high-intensity light source of the present invention includes an excitation light source (or a plurality of excitation light sources) (solid device: laser diode (LD) or light emitting diode (LED)); a light guide converging member which has a light exit section whose cross-sectional area is smaller than that of a light incidence section; and a fluorescent light emitting section which is attached to the light exit section of the light guide converging member.

The light exit section of the light guide converging member and the fluorescent light emitting section can be in contact with each other directly. Alternatively, the light exit section of the light guide converging member and the fluorescent light emitting section can be away from each other.

Moreover, a light-transmitting member or a heat-radiating member which has a refractive index different from that of air can be provided (i) between the excitation light source and the light incidence section and/or (ii) between the light exit section and the fluorescent light emitting section.

The configuration makes it possible to efficiently guide and converge excitation light emitted from (a plurality of) excitation light source(s) onto the fluorescent light emitting section. This makes it possible to realize a light source which emits light having a high luminous flux and a high luminance.

According to the light emitting device of the present invention, it is preferable that, in addition to the configuration describe above, the light guide irradiation member has a surrounded structure in which the light guide irradiation member is configured so as to be surrounded by a light reflective lateral face, the surrounded structure allows the excitation light, which is entered via the one end, to be guided toward the other end.

According to the configuration, the surrounded structure in which the light guide irradiation member is configured to be surrounded by the light reflective lateral face allows the excitation light entered via the one end of the light guide irradiation member to be guided toward the other end.

The "surround" means enclosing a light path of the excitation light emitted from the excitation light source.

The "surrounded structure" can be exemplified by lateral faces of a truncated pyramid or a lateral face of a truncated cone such as a lateral face of a circular truncated cone or a lateral face of an elliptic truncated cone.

The case where "the surrounded structure allows the excitation light . . . to be guided toward the other end" encompasses cases where (i) the excitation light is reflected from the light reflective lateral face only once and then guided toward the other end, (ii) the excitation light is reflected from the light reflective lateral face more than once and then guided toward the other end, and (iii) the excitation light is guided to the other end without being reflected from the light reflective lateral face.

According to the light emitting device of the present invention, it is possible that, in addition to the configuration describe above, in a case where the excitation light source includes a plurality of excitation light sources and the light guide irradiation member includes a plurality of light guide irradiation members, each of the plurality of excitation light sources generates corresponding excitation light, and a corresponding one of the plurality of light guide irradiation members, which has one end and the other end, guides the corresponding excitation light, entered via the one end, toward the other end.

According to the configuration, even in a case where the plurality of excitation light sources are disposed off from each other, it is possible to converge, onto the light irradiation area, rays of the excitation light generated by the plurality of excitation light sources, provided that the other ends of the respective of the plurality of light guide irradiation members are put together.

Note that the "plurality of excitation light sources" can include only LD(s) or LED(s). Alternatively, the "plurality of excitation light sources" can include both LD(s) and LED(s).

According to the light emitting device of the present invention, it is possible that, in addition to the configuration describe above, in a case where the excitation light source includes a plurality of excitation light sources, the one end of the light guide irradiation member has a cross-sectional shape which allows the plurality of excitation light sources to be provided so as to be equidistant from a center of the light irradiation area.

According to the configuration, for example, it is possible to substantially maximize a utilization efficiency (coupling efficiency=emitted light from the other end/incident light on the one end) of light (excitation light) generated by each of the plurality of excitation light sources, in a case where (i) the plurality of excitation light sources are provided so as to be equidistant from the center of the light irradiation area, and (ii) the plurality of excitation light sources are provided so as to face the center of the light irradiation area.

In this case, it is also possible for rays of the excitation light generated by the plurality of excitation light sources to have substantially identical optical distances. Accordingly, for example, in a case where each of the rays of excitation light generated by the plurality of excitation light sources is coherent light like a laser beam, it is possible to further enhance intensity of the rays of excitation light by causing the rays of excitation light to have identical phases.

The "cross-sectional shape" can be, for example, a cross-sectional shape of the light guide irradiation member, whose cutting-plane line is a circular arc which is at equal distances from a center of the light irradiation area of the light emitting section. Note that the cutting-plane line is obtained when the other end of the light guide irradiation member is horizontally cut. Alternatively, the "cross-sectional shape" can be, for example, a cross-sectional shape of the light guide irradiation member whose cutting-plane line is a polygonal curve made up of a plurality of lines at equal distances from the center of the light irradiation area of the light emitting section. Note that the cutting-plane line is obtained when the other end of the light guide irradiation member is horizontally cut.

According to the light emitting device of the present invention, it is possible that, in addition to the configuration describe above, the plurality of the light guide irradiation members have the respective one ends which are equidistant from a center of the light irradiation area.

According to the configuration, for example, it is possible to substantially maximize a utilization efficiency (coupling efficiency=emitted light from the other end/incident light on the one end) of light (excitation light) generated by each of the plurality of excitation light sources, in a case where (i) the plurality of excitation light sources are provided so as to be equidistant from the center of the light irradiation area, and (ii) the plurality of excitation light sources are provided so as to face the center of the light irradiation area.

In this case, it is also possible for rays of the excitation light generated by the plurality of excitation light sources to have substantially identical optical distances. Accordingly, for example, in a case where each of the rays of excitation light generated by the plurality of excitation light sources is coherent light like a laser beam, it is possible to further enhance intensity of the rays of excitation light by causing the rays of excitation light to have identical phases.

According to the light emitting device of the present invention, it is possible that, in addition to the configuration describe above, the light reflective lateral face of the light guide irradiation member is a curved face which is projected inward in the vicinity of the other end.

For example, in a case where the light guide irradiation member is a truncated conic light guide irradiation member such as a truncated pyramid or a circular truncated cone whose generating lines are straight lines, there is a problem that, when the excitation light is reflected from the light reflective lateral face several times, an incident angle at which the excitation light enters the light reflective lateral face becomes small in the vicinity of the other end of the light guide irradiation member, and therefore will never reach the light irradiation area.

However, in the case where the light guide irradiation member has the light reflective lateral face which is projected inward in the vicinity of the other end, it is possible to enlarge an incident angle of the excitation light which is reflected from the light reflective lateral face several times and then incident on the light reflective lateral face. Accordingly, it is possible to prevent the case where the excitation light from not reaching the light irradiation area. This allows a luminous efficiency of the light emitting section to be improved.

According to the light emitting device of the present invention, it is possible that, in addition to the configuration described above, the other end of the light guide irradiation member is in contact with the light irradiation area.

In a case where the other end of the light guide irradiation member has a flat cross-sectional plane, the irradiation range of the excitation light on the other end or in the vicinity of the other end tends to become larger than the cross section of the other end of the light guide irradiation member.

In view of this, in a case where the other end of the light guide irradiation member is in contact with the light irradiation area, the light irradiation area of the light emitting section is to be irradiated with the excitation light before the irradiation range of the excitation light spread larger than the light irradiation area.

This makes it possible to prevent the irradiation range of the excitation light from becoming larger than the size of the light emitting section.

Note that, the case where "the other end of the light guide irradiation member is in contact with the light irradiation area" encompasses (i) a case where the other end of the light guide irradiation member is in contact with the light irradiation area and (ii) a case where the other end of the light guide irradiation member and the light irradiation area are joined. To "join" encompasses (i) joining by a method such as adhesion or welding and (ii) compression bonding.

According to the light emitting device of the present invention, it is possible that, in addition to the configuration described above, the other end of the light guide irradiation member has a concave-lens-like curved surface which faces the light irradiation area.

According to the configuration, the concave-lens-like curved surface functions to make the irradiation range of the excitation light spread while keeping the distance between the other end and the light irradiation area, even in a case where the other end of the light guide irradiation member is away from the light irradiation area of the light emitting section and the irradiation range of the excitation light emitted from the other end of the light guide irradiation member becomes smaller than the light irradiation area. Accordingly, it is possible to irradiate the light irradiation area with the excitation light whose irradiation range is set in accordance with a size of the light irradiation area.

According to the light emitting device of the present invention, it is possible that, in addition to the configuration described above, the other end of the light guide irradiation member has a convex-lens-like curved surface which faces the light irradiation area.

According to the configuration, the convex-lens-like curved surface functions to reduce the irradiation range of the excitation light while keeping the distance between the other end and the light irradiation area, even in a case where the light guide irradiation member is away from the light irradiation area of the light emitting section and the irradiation range of the excitation light emitted from the other end of the light guide irradiation member becomes larger than the light irradiation area. Accordingly, it is possible to irradiate the light irradiation area with the excitation light whose irradiation range is set in accordance with a size of the light irradiation area.

According to the light emitting device of the present invention, it is possible that, in addition to the configuration described above, the light guide irradiation member is made of a material which has a refractive index higher than that of air, and the light guide irradiation member has an outer face which is exposed to air, and the light emitting device further includes: a holding member which is in contact with a plurality of points on the outer face of the light guide irradiation member so as to hold the light guide irradiation member.

According to the configuration, the outer face of the light guide irradiation member is exposed to air. The light guide irradiation member is made of a material which has a refractive index higher than that of the air. Accordingly, it is possible to ensure, with a simple configuration, a difference of refractive indexes (a refractive index on the outer face side>a refractive index of the air) between the air and the outer face of the light guide irradiation member. This allows incident light, which travels from the outer face side toward the air side at a predetermined incident angle, to be subjected to a total reflection.

Moreover, according to the configuration, the light emitting device of the present invention includes the holding member which is in contact with a plurality of points on the outer face of the light guide irradiation member so as to hold the light guide irradiation member. This makes it possible to reduce contact areas between the holding member and the outer face of the light guide irradiation member. Further, this makes it possible to reduce areas of parts (a plurality of parts) in which the differences of refractive indexes between the air and the outer face of the elliptic truncated conic light converging section 21 become uneven.

It is preferable that the illuminating device of the present invention includes any of the light emitting devices described above.

According to the configuration, it is possible to provide the illuminating device which can prevent the irradiation range of the excitation light from becoming larger than the size of the light emitting section.

The vehicle headlight of the present invention can includes the light emitting device and a reflecting mirror which reflects light emitted from the light emitting section so as to form bundle of light rays which travels in a predetermined solid angle.

According to the configuration, light emitted from the light emitting section is reflected from the reflecting mirror so as to form a bundle of light rays which travels in a predetermined solid angle. Accordingly, it is possible to provide the vehicle headlight which prevents the irradiation range of the excitation light from becoming larger than the size of the light emitting section.

Moreover, the present invention can be expressed as follows.

The excitation light source of the light emitting device of the present invention can be a laser diode.

It is possible that (i) the excitation light source of the light emitting device of the present invention is made up of a single laser diode having a plurality of laser beam emission edges, and (ii) the excitation light is a laser beam emitted from a corresponding one of the plurality of laser beam emission edges.

The light emitting section of the light emitting device of the present invention can contain an oxynitride fluorescent substance.

According to the light emitting device of the present invention, the light emitting section can emit light with a luminance of 80 Mcd/m$^2$ or more.

According to the light emitting device of the present invention, the light emitting section can emit light with a luminous flux of 1500 lm or more but 3200 lm or less.

According to the configuration, it is possible to prevent the irradiation range of the excitation light from becoming larger than a size of the light emitting section.

Note that the present invention is not limited to the embodiments, but can be altered by a skilled person in the art within the scope of the claims. An embodiment derived from a proper combination of technical means disclosed in respective different embodiments is also encompassed in the technical scope of the present invention.

INDUSTRIAL APPLICABILITY

The present invention is applicable to a light emitting device, an illuminating device, a lighting device, a lighting equipment, and, in particular, a head lamp of a vehicle, etc., which are demanded to be smaller in size.

REFERENCE SIGNS LIST

10: Laser diode group (excitation light source)
11: LD chip (excitation light source)
13: LED lamp (excitation light source)
20: Light guide irradiation section (light guide irradiation member)
21: Elliptic truncated conic light converging section (light guide irradiation member)
22A through 22C: Circular truncated conic light converging section (light guide irradiation member)
23: Equidistant arrangement light converging section (light guide irradiation member)
24: Turtleneck-shaped light converging section (light guide irradiation member)
30: Convex-lens-like curved surface (the other end)
31: Concave-lens-like curved surface (the other end)
40: Cylindrical light emitting element (light emitting section)
41: Rectangular parallelepiped light emitting element (light emitting section)
90: Reflecting mirror
101: LD chip (excitation light source)
102: light emitting point (excitation light source)
110, 120A, and 120B: Light emitting device (illuminating device, vehicle headlight)
140: Illuminating device (light emitting device, vehicle headlight)
130: LED chip (excitation light source)
201: Light incidence plane (one end)
202: Light irradiation plane (the other end)
211: Light incidence plane (one end)
212: Light irradiation plane (the other end)
213: Lateral face of elliptic truncated cone (light reflective lateral face, surrounded structure)
221A through 221C: Light incidence plane (one end)
222A through 222C: Light emission plane (the other end)
223A through 223C: Lateral face of circular truncated cone (light reflective lateral face, surrounded structure)
231: Light incidence curved surface (one end)
232: Light irradiation plane (the other end)
233: Lateral face of elliptic truncated cone (light reflective lateral face, surrounded structure)
242: Light irradiation plane (the other end)
243: Constricted lateral face (light reflective lateral face, surrounded structure)
L0, LA, and LB: Laser beam (excitation light)
L1: Incoherent light (light)
O: Center (center of light irradiation area)

The invention claimed is:

1. A light emitting device comprising:
a laser device which generates excitation light;
a light emitting section from which light is emitted in response to the excitation light; and
a light guide irradiation member, having one end and the other end, which guides the excitation light, having entered via the one end, toward the other end and irradiates a predetermined light irradiation area of the light emitting section with the excitation light thus guided,
the other end having a cross-sectional area which is smaller than that of the one end, so that the light guide irradiation member prevents an irradiation range of the excitation light from becoming larger than the size of the light emitting section, a luminance of the light emitting section being larger than 75 cd/mm$^2$, and an area of a cross-section of an opening part of the light emitting device, through which light is emitted from the light emitting section, being smaller than 1500 mm$^2$, and the light emitting section emitting the light with a luminous flux of more than 2000 lm.

2. The light emitting device as set forth in claim 1, wherein: the light guide irradiation member has a surrounded structure in which the light guide irradiation member is configured so as to be surrounded by a light reflective lateral face, the surrounded structure allows the excitation light, which is entered via the one end, to be guided toward the other end.

3. The light emitting device as set forth in claim 1, wherein: the laser device includes a plurality of laser devices and the light guide irradiation member includes a plurality of light guide irradiation members, and each of the plurality of laser devices generates corresponding excitation light, and a corresponding one of the plurality of light guide irradiation members, which has one end and the other end, guides the corresponding excitation light, entered via the one end, toward the other end.

4. The light emitting device as set forth in claim 1, wherein: the laser device includes a plurality of laser devices, and the one end of the light guide irradiation member has a cross-sectional shape which allows the plurality of laser devices to be provided so as to be equidistant from a center of the light irradiation area.

5. The light emitting device as set forth in claim 3, wherein: the plurality of the light guide irradiation members have the respective one ends which are equidistant from a center of the light irradiation area.

6. The light emitting device as set forth in claim 2, wherein: the light reflective lateral face of the light guide irradiation member is a curved face which is projected inward in the vicinity of the other end.

7. The light emitting device as set forth in claim 1, wherein: the other end of the light guide irradiation member is in contact with the light irradiation area.

8. The light emitting device as set forth in claim 1, wherein: the other end of the light guide irradiation member has a concave-lens-like curved surface which faces the light irradiation area.

9. The light emitting device as set forth in claim 1, wherein: the other end of the light guide irradiation member has a convex-lens-like curved surface which faces the light irradiation area.

10. A light emitting device as set forth in claim 1, the light guide irradiation member being made of a material which has a refractive index higher than that of air, and the light guide irradiation member having an outer face which is exposed to air, said light emitting device further comprising:

a holding member which is in contact with a plurality of points on the outer face of the light guide irradiation member so as to hold the light guide irradiation member.

11. An illuminating device comprising a light emitting device recited in claim 1.

12. A vehicle headlight comprising:

a light emitting device recited in claim 1; and a reflecting mirror which reflects light emitted from the light emitting section so as to form a bundle of light rays which travels in a predetermined solid angle.

\* \* \* \* \*